US012613576B2

(12) United States Patent
Kim et al.

(10) Patent No.: US 12,613,576 B2
(45) Date of Patent: Apr. 28, 2026

(54) WEARABLE DEVICE PROVIDING IMMERSIVE EXPERIENCE AND METHOD OF CONTROLLING SAME

(71) Applicant: Samsung Electronics Co., Ltd., Suwon-si (KR)

(72) Inventors: Jiwon Kim, Suwon-si (KR); Eunhye Shin, Suwon-si (KR); Jaeyung Yeo, Suwon-si (KR); Jinwon Lee, Suwon-si (KR); Hyunjun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/985,729

(22) Filed: Dec. 18, 2024

(65) Prior Publication Data

US 2025/0199612 A1 Jun. 19, 2025

Related U.S. Application Data

(63) Continuation of application No. PCT/KR2024/020565, filed on Dec. 18, 2024.

(30) Foreign Application Priority Data

Dec. 18, 2023 (KR) ........................ 10-2023-0184681
Jan. 30, 2024 (KR) ........................ 10-2024-0013767

(51) Int. Cl.
    *G06F 3/01* (2006.01)
(52) U.S. Cl.
    CPC .................................... *G06F 3/013* (2013.01)
(58) Field of Classification Search
    None
    See application file for complete search history.

(56) References Cited

U.S. PATENT DOCUMENTS 9,898,865 B2 * 2/2018 Thompson ............ G06T 19/006
11,443,650 B2 9/2022 Kim
                    (Continued)

FOREIGN PATENT DOCUMENTS

CN    117043709 A    11/2023
JP      5286371 A     9/2013
                    (Continued)

OTHER PUBLICATIONS

International Search Report with English translation and Written Opinion dated Mar. 31, 2025; International Appln. No. PCT/KR2024/020565.

(Continued)

*Primary Examiner* — Parul H Gupta
(74) *Attorney, Agent, or Firm* — Jefferson IP Law, LLP

(57) ABSTRACT

A wearable device providing an immersive experience and a method of controlling the same are provided. The wearable device includes at least one sensor, at least one camera, memory storing one or more computer programs, and one or more processors communicatively coupled to the at least one sensor, at least one camera, and the memory, wherein the one or more computer programs include computer-executable instructions that, when executed by the one or more processors individually or collectively, cause the wearable device to identify a real object located around a user based on an image of a real world obtained through the at least one camera, identify a posture of the user wearing the wearable device based on sensing data obtained by the at least one sensor, based on the identified real object and the posture of the user, determine a first immersion level, based on the determined first immersion level, display an execution screen of at least one application as a virtual object, while the virtual object is displayed, determine a second immersion level based on interaction with the virtual object and the (Continued)

START

IDENTIFY AT LEAST ONE REAL OBJECT LOCATED AROUND USER BASED ON IMAGE OF REAL WORLD OBTAINED THROUGH AT LEAST ONE CAMERA — 410

IDENTIFY POSTURE OF USER WEARING WEARABLE DEVICE BASED ON SENSING DATA OBTAINED BY AT LEAST ONE SENSOR — 420

DETERMINE FIRST IMMERSION LEVEL BASED ON IDENTIFIED POSTURE OF USER AND AT LEAST ONE REAL OBJECT — 430

DISPLAY EXECUTION SCREEN OF AT LEAST ONE APPLICATION AS VIRTUAL OBJECT BASED ON DETERMINED FIRST IMMERSION LEVEL — 440

DETERMINE SECOND IMMERSION LEVEL BASED ON VIRTUAL OBJECT AND INTERACTION WITH USER WHILE VIRTUAL OBJECT IS DISPLAYED — 450

CHANGE DISPLAY SCHEME OF VIRTUAL OBJECT BASED ON DETERMINED SECOND IMMERSION LEVEL — 460

END user, and based on the determined second immersion level, change a display scheme of the virtual object.

15 Claims, 34 Drawing Sheets

(56)                    References Cited

U.S. PATENT DOCUMENTS

| | | | |
|---|---|---|---|
| 11,562,528 B2 | 1/2023 | Rockel et al. | |
| 11,709,541 B2 | 7/2023 | Olson et al. | |
| 2011/0267374 A1 | 11/2011 | Sakata et al. | |
| 2017/0337742 A1* | 11/2017 | Powderly | G06F 3/015 |
| 2017/0360295 A1 | 12/2017 | Oz et al. | |
| 2019/0217198 A1* | 7/2019 | Clark | H04S 7/303 |
| 2020/0357374 A1* | 11/2020 | Verweij | G10K 11/17827 |
| 2022/0092862 A1 | 3/2022 | Faulkner et al. | |
| 2022/0101593 A1* | 3/2022 | Rockel | G06F 3/017 |
| 2022/0101613 A1* | 3/2022 | Rockel | G06F 3/04845 |
| 2022/0155909 A1 | 5/2022 | Kawashima et al. | |
| 2022/0214743 A1* | 7/2022 | Dascola | G06F 3/017 |
| 2023/0106627 A1* | 4/2023 | Dascola | G06F 3/011 |
| | | | 345/419 |
| 2023/0215304 A1 | 7/2023 | Nicholson et al. | |
| 2023/0315247 A1* | 10/2023 | Pastrana | G06F 1/1694 |
| | | | 715/716 |
| 2024/0103686 A1* | 3/2024 | Pazmino | H04L 67/12 |

FOREIGN PATENT DOCUMENTS

| | | |
|---|---|---|
| KR | 10-2014-0066258 A | 5/2014 |
| KR | 10-2017-0104463 A | 9/2017 |
| KR | 10-2021-0062962 A | 6/2021 |
| KR | 10-2022-0080030 A | 6/2022 |
| KR | 10-2022-0148893 A | 11/2022 |
| KR | 10-2023-0047184 A | 4/2023 |
| KR | 10-2023-0048450 A | 4/2023 |
| KR | 10-2023-0048554 A | 4/2023 |

OTHER PUBLICATIONS

Anonymous; Introducing Apple Vision Pro; https://www.youtube.com/watch?v=TX9qSaGXFyg.

* cited by examiner

510

| | Criteria for determination | Sensing method | Type | Score (e.g., watching video) | Score (e.g., immersive game) |
|---|---|---|---|---|---|
| Display environment configuration | User's posture | Camera, gyro sensor and/or acceleration sensor | ① Standing up | 1 | 2 |
| | | | ② Moving in place | 1 | 1 |
| | | | ③ Walking around | x 0 (Reset) | x 0 (Reset) |
| | | | ④ Sitting | 2 | 1 |
| | | | ⑤ Lying down | 3 | 1 |
| | Recognizing surrounding object | Camera and/or eye tracking sensor | ① Work/study environment (PC, desk, notebook, pen, etc.) | 1 | 1 |
| | | | ② Rest environment (bed, sofa, lamp, etc.) | 2 | 2 |
| | | | ③ User attention to physical object occur | x 0 (Reset) | x 0 (Reset) |
| Determining immersion level | Characteristics of App | ‹ | ① Viewable content (e.g., watching multimedia) | - | - |
| | | | ② Experiential content (e.g., game, education, etc.) | - | - |
| | Interaction with App | ‹ | ① Minimum interaction (appreciation) | 1 | 0 |
| | | | ② Frequent interactions (operation) | 0 | 1 |
| | | | ③ User attention to specific App occur | 1 | 1 |
| | | | ④ Multi-casting | 0 | 0 |
| | Whether surrounding device is connected | - | Connect with PC and Tablet | -1 | -1 |

FIG. 7A

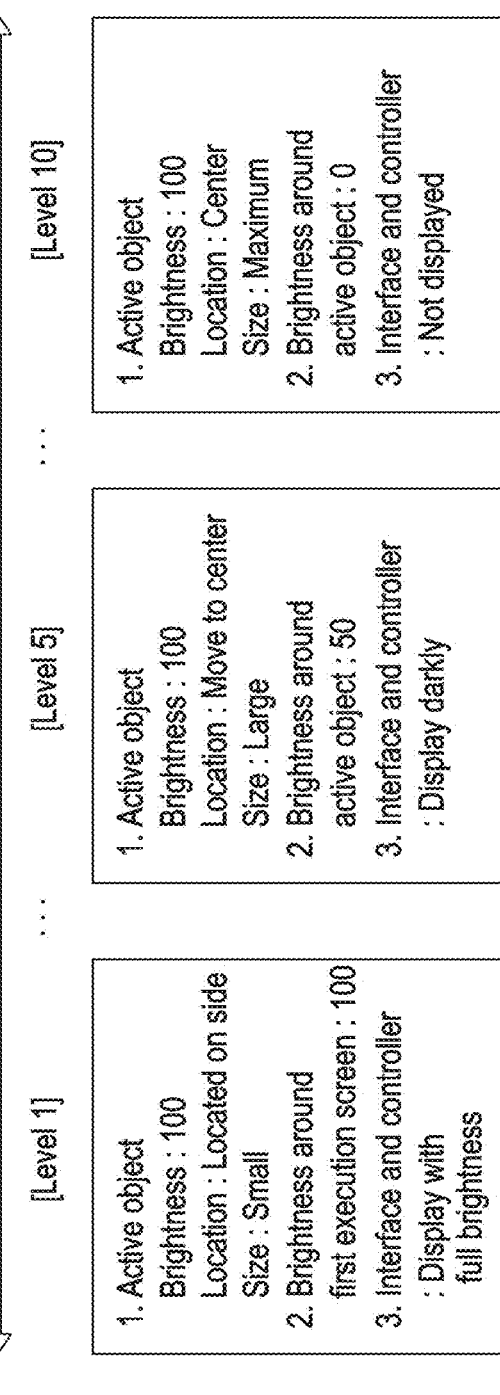

[Level 1]

1. Active object
   Brightness : 100
   Location : Located on side
   Size : Small
2. Brightness around
   first execution screen : 100
3. Interface and controller
   : Display with
   full brightness

[Level 5]

1. Active object
   Brightness : 100
   Location : Move to center
   Size : Large
2. Brightness around
   active object : 50
3. Interface and controller
   : Display darkly

[Level 10]

1. Active object
   Brightness : 100
   Location : Center
   Size : Maximum
2. Brightness around
   active object : 0
3. Interface and controller
   : Not displayed

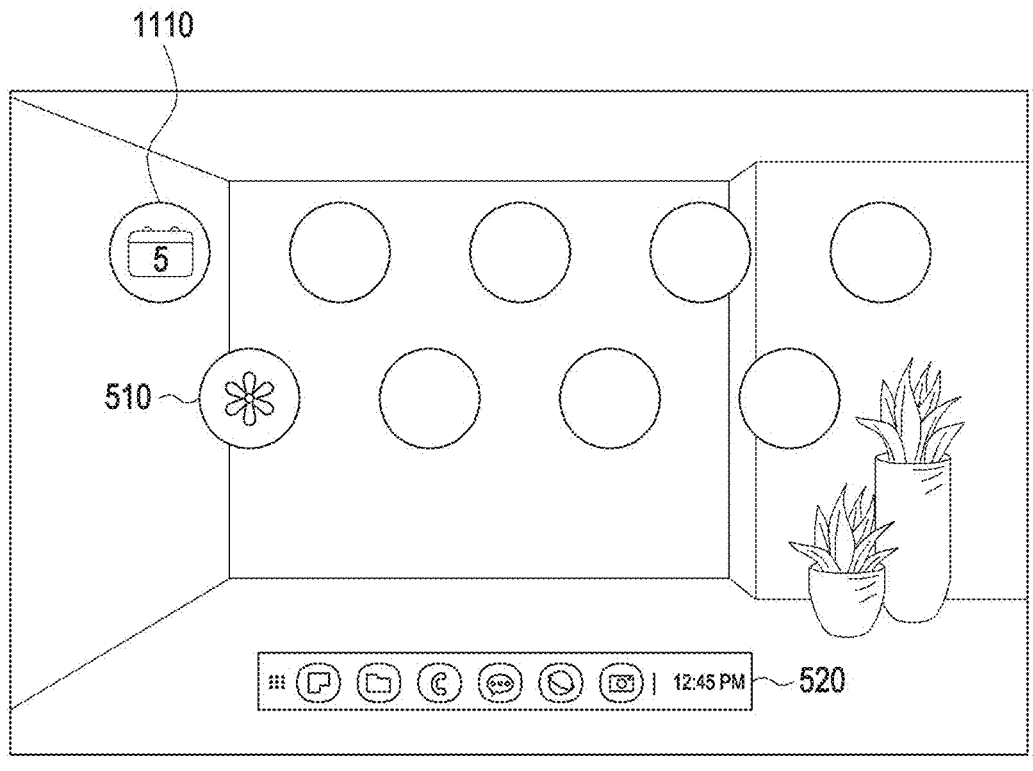
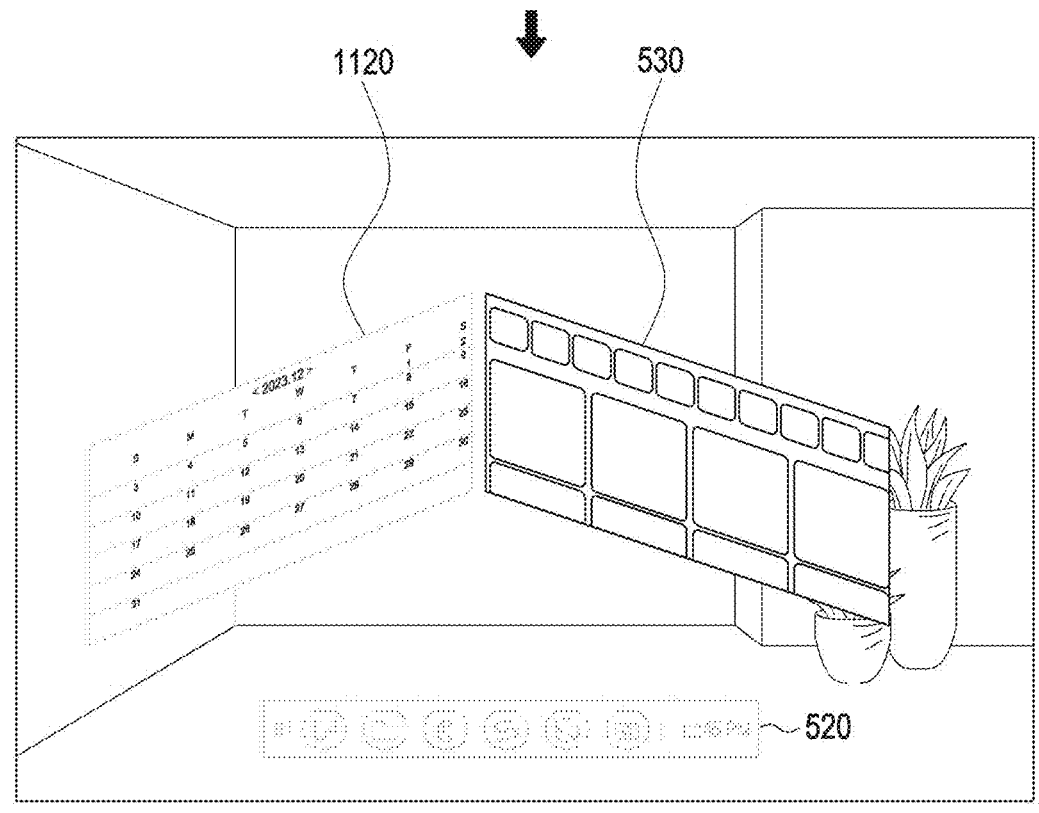
FIG. 15A

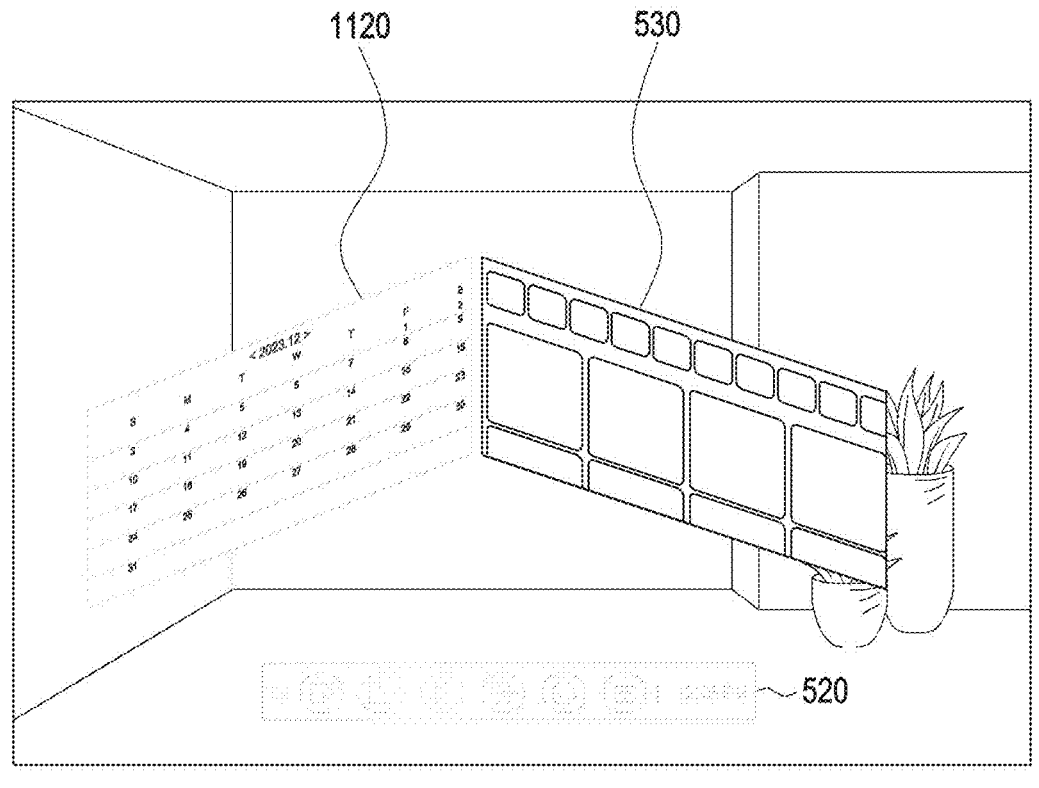
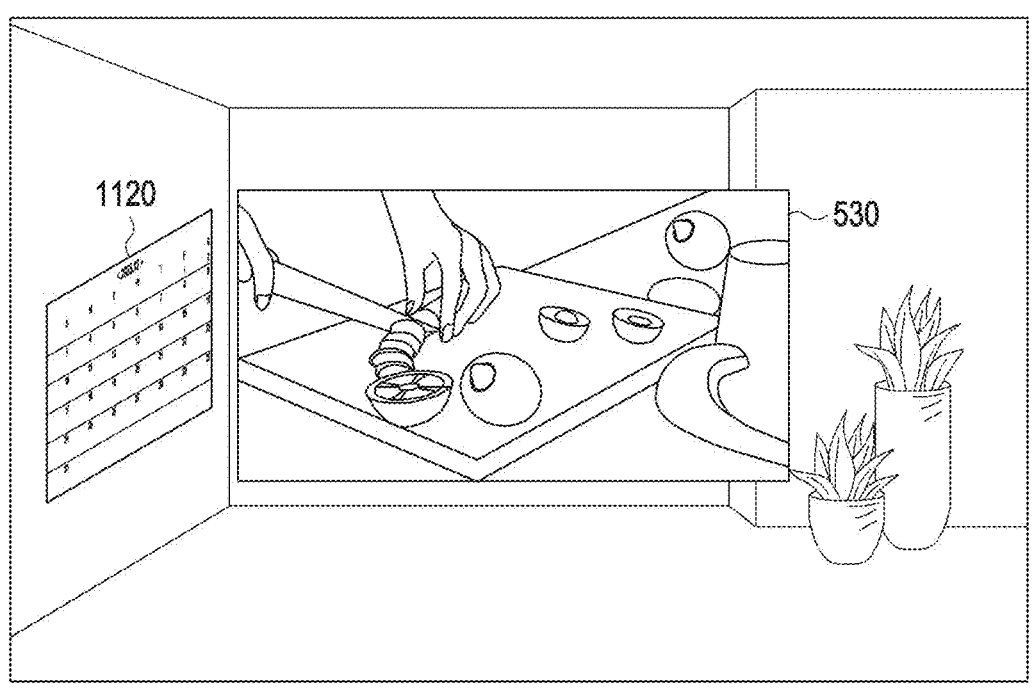
FIG. 15B

WEARABLE DEVICE PROVIDING IMMERSIVE EXPERIENCE AND METHOD OF CONTROLLING SAME

CROSS-REFERENCE TO RELATED APPLICATION(S)

This application is a continuation application, claiming priority under § 365(c), of an International application No. PCT/KR2024/020565, filed on Dec. 18, 2024, which is based on and claims the benefit of a Korean patent application number 10-2023-0184681, filed on Dec. 18, 2023, in the Korean Intellectual Property Office, and of a Korean patent application number 10-2024-0013767, filed on Jan. 30, 2024, in the Korean Intellectual Property Office, the disclosure of each of which is incorporated by reference herein in its entirety.

TECHNICAL FIELD

The disclosure relates to a wearable device providing an immersive experience and a method of controlling the same.

BACKGROUND ART

Various services and additional functions provided through portable electronic devices such as wearable devices, for example, augmented reality/virtual reality devices, are gradually increasing. In order to increase the utility value of these electronic devices and satisfy the needs of various users, communication service providers or electronic device manufacturers are competitively developing electronic devices to provide various functions and differentiate themselves from other companies. Accordingly, various functions provided through wearable devices are also becoming increasingly advanced.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

A wearable device may provide an immersive view by processing the surroundings of a running virtual object (e.g., the execution screen of an application) relatively dark or blurry. Conventional wearable devices may be switched to an immersive view only in some specific situations, such as watching a movie. Accordingly, in order for a user to enter the immersive view environment, it may be cumbersome to manually change the view method.

Technical Solution

Aspects of the disclosure are to address at least the above-mentioned problems and/or disadvantages and to provide at least the advantages described below. Accordingly, an aspect of the disclosure is to provide a wearable device configured to provide an optimal view environment to a user based on the posture of a user wearing the wearable device (e.g., augmented reality glasses configured to provide an augmented reality and/or virtual reality environment) and the physical environment around the user.

Another aspect of the disclosure is to provide a wearable device configured to provide an optimal view environment to a user by adaptively changing the immersive view environment based on the interaction between the virtual object (e.g., application execution screen) displayed through the wearable device and the user.

Another aspect of the disclosure is to provide a method of controlling a wearable device configured to provide an optimal view environment to a user based on the posture of a user wearing the wearable device (e.g., augmented reality glasses configured to provide an augmented reality and/or virtual reality environment) and the physical environment around the user.

Another aspect of the disclosure is to provide a method of controlling a wearable device configured to provide an optimal view environment to a user by adaptively changing the immersive view environment based on the interaction between the virtual object (e.g., application execution screen) displayed through the wearable device and the user.

Additional aspects will be set forth in part in the description which follows and, in part, will be apparent from the description, or may be learned by practice of the presented embodiments.

In accordance with an aspect of the disclosure, a wearable device is provided. The wearable device includes at least one sensor, at least one camera, memory storing one or more computer programs, and one or more processors communicatively coupled to the at least one sensor, at least one camera, and the memory, wherein the one or more computer programs include computer-executable instructions that, when executed by the one or more processors individually or collectively, cause the wearable device to identify a real object located around a user based on an image of a real world obtained through the at least one camera, identify a posture of the user wearing the wearable device based on sensing data obtained by the at least one sensor, based on the identified real object and the posture of the user, determine a first immersion level, based on the determined first immersion level, display an execution screen of at least one application as a virtual object, while the virtual object is displayed, determine a second immersion level based on interaction with the virtual object and the user, and based on the determined second immersion level, change a display scheme of the virtual object.

In accordance with another aspect of the disclosure, a method performed by a wearable device is provided. The method includes identifying, by the wearable device, a real object located around a user based on an image of a real world obtained through at least one camera of the wearable device, identifying, by the wearable device, a posture of the user wearing the wearable device based on sensing data obtained by at least one sensor of the wearable device, based on the identified real object and the posture of the user, determining, by the wearable device, a first immersion level, based on the determined first immersion level, displaying, by the wearable device, an execution screen of at least one application as a virtual object, while the virtual object is displayed, determining, by the wearable device, a second immersion level based on interaction with the virtual object and the user, and based on the determined second immersion level, changing, by the wearable device, a display scheme of the virtual object.

In accordance with another aspect of the disclosure, one or more non-transitory computer-readable storage media storing one or more computer programs, the one or more computer programs including computer-executable instructions that, when executed by one or more processors of a wearable device individually or collectively, cause the wearable device to perform operations are provided. The operations include identifying, by the wearable device, a real object located around a user based on an image of a real world obtained through at least one camera, identifying, by the wearable device, a posture of the user wearing the wearable device based on sensing data obtained by at least one sensor, based on the identified real object and the posture of the user, determining, by the wearable device, a first immersion level, based on the determined first immersion level, displaying, by the wearable device, an execution screen of at least one application as a virtual object, while the virtual object is displayed, determining, by the wearable device, a second immersion level based on interaction with the virtual object and the user, and based on the determined second immersion level, changing, by the wearable device, a display scheme of the virtual object.

Through a wearable device according to an embodiment of the disclosure, a technical effect capable of providing an optimal view environment to a user based on the posture of a user wearing the wearable device (e.g., augmented reality glasses configured to provide an augmented reality and/or virtual reality environment) and the physical environment around the user is exerted.

Through a wearable device according to an embodiment of the disclosure, a technical effect capable of providing an optimal view environment to a user by adaptively changing the immersive view environment based on the interaction between the virtual object (e.g., application execution screen) displayed through the wearable device and the user is exerted.

Other aspects, advantages, and salient features of the disclosure will become apparent to those skilled in the art from the following detailed description, which, taken in conjunction with the annexed drawings, discloses various embodiments of the disclosure.

ADVANTAGEOUS EFFECTS

BRIEF DESCRIPTION OF DRAWINGS

The above and other aspects, features, and advantages of certain embodiments of the disclosure will be more apparent from the following description taken in conjunction with the accompanying drawings, in which:

FIG. 7A is a diagram illustrating an immersive score for determining an immersion level (e.g., a first immersion level and/or a second immersion level) according to an embodiment of the disclosure;

FIG. 7B is a diagram illustrating an immersion level (e.g., a first immersion level and/or a second immersion level) according to an embodiment of the disclosure;

FIGS. 15A and 15B are diagrams illustrating a function or operation described in FIG. 14 from a user interface perspective according to various embodiments of the disclosure;

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
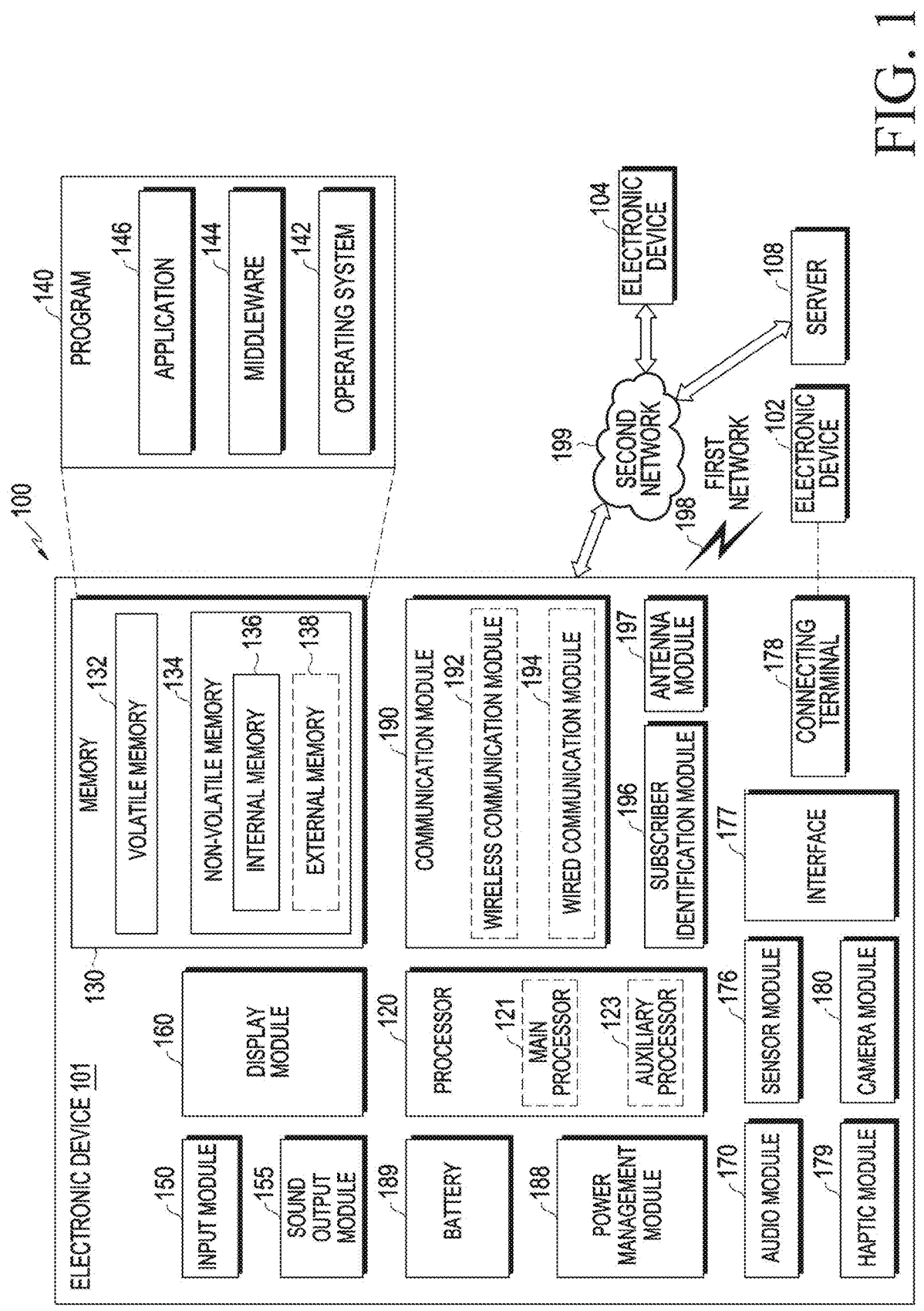
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the electronic device 104 may include an internet-of-things (IoT) device. The server 108 may be an intelligent server using machine learning and/or a neural network. According to an embodiment, the electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
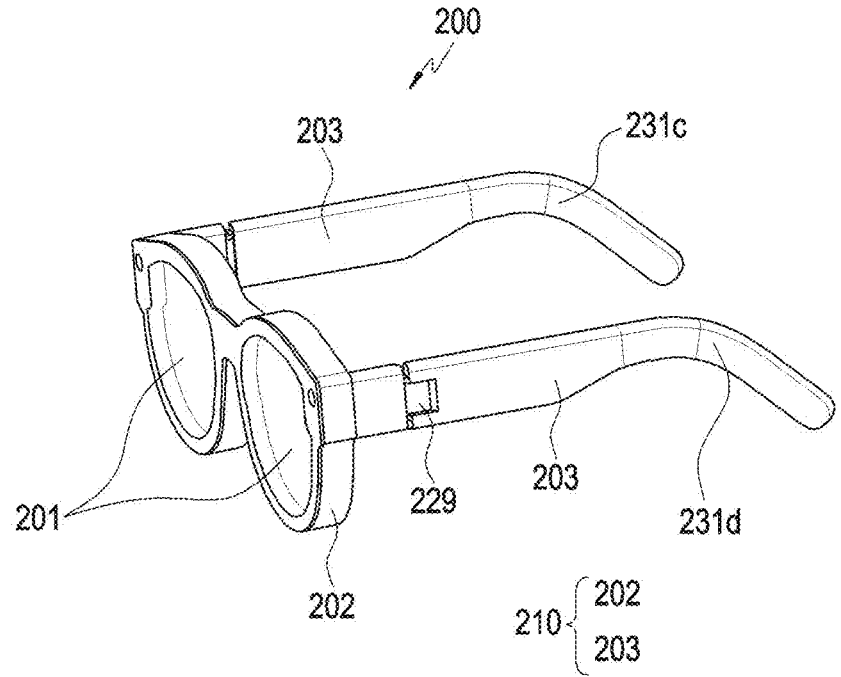
FIG. 2A is a perspective view of a wearable device (e.g., an electronic device) according to an embodiment of the disclosure.

FIG. 2A is a perspective view of a wearable device 200 according to an embodiment of the disclosure.

Referring to FIG. 2A, the wearable device 200 is an electronic device in the form of glasses, and the user may visually recognize surrounding objects or environments while wearing the wearable device 200. For example, the wearable device 200 may be a head-mounted device (HMD) or smart glasses that may provide an image directly in front of the user's eyes. The configuration of the wearable device 200 of FIG. 2A may be the same in whole or in part as the configuration of the electronic device 101 of FIG. 1.

According to various embodiments, the wearable device 200 may include a housing 210 forming the exterior of the wearable device 200. The housing 210 may provide a space in which components of the wearable device 200 may be disposed. For example, the housing 210 may include a lens frame 202 and at least one wearing member 203.

According to various embodiments, the wearable device 200 may include a display member 201 capable of providing visual information to a user. For example, the display member 201 may include a module equipped with a lens, a display, a waveguide, and/or a touch circuit. According to an embodiment, the display member 201 may be formed to be transparent or translucent. According to an embodiment, the display member 201 may include glass made of a translucent material or a window member in which a transmittance of light may be adjusted as a coloring concentration is adjusted. According to an embodiment, the display members 201 may be provided in a pair, and may be disposed to correspond to the user's left eye and right eye, respectively, while the wearable device 200 is worn on the user's body.

According to various embodiments, the lens frame 202 may accommodate at least a portion of the display member 201. For example, the lens frame 202 may surround at least a portion of an edge of the display member 201. According to an embodiment, the lens frame 202 may position at least one of the display members 201 corresponding to the user's eyes. According to an embodiment, the lens frame 202 may be a rim of a general glasses structure. According to an embodiment, the lens frame 202 may include at least one closed curve surrounding the display member 201.

According to various embodiments, the wearing member 203 may extend from the lens frame 202. For example, the wearing member 203 may extend from the end of the lens frame 202 and may be supported or positioned on the user's body (e.g., an ear) together with the lens frame 202. According to an embodiment, the wearing member 203 may be rotatably coupled to the lens frame 202 through a hinge structure 229. According to an embodiment, the wearing member 203 may include an inner side surface 231c configured to face the user's body and an outer side surface 231d opposite the inner side surface.

According to various embodiments, the wearable device 200 may include the hinge structure 229 configured to fold the wearing member 203 with respect to the lens frame 202. The hinge structure 229 may be disposed between the lens frame 202 and the wearing member 203. In a state in which the wearable device 200 is not worn, the user may fold the wearing member 203 so that the wearing member 203 partially overlaps the lens frame 202 to carry or store the same.

Figure 2B:
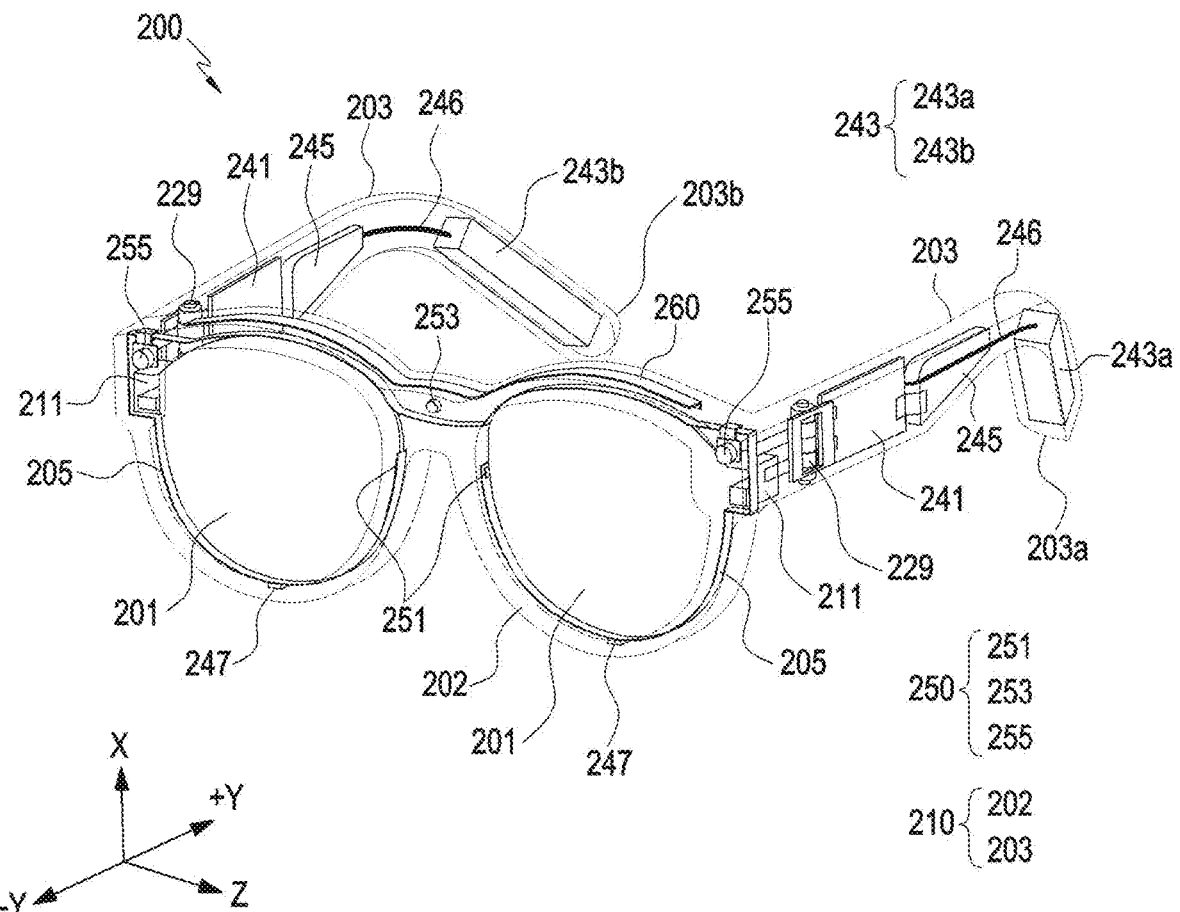
FIG. 2B is a perspective view illustrating the internal configuration of a wearable device (e.g., an electronic device) according to an embodiment of the disclosure.

FIG. 2B is a perspective view illustrating the internal configuration of a wearable device according to an embodiment of the disclosure.

Figure 2C:
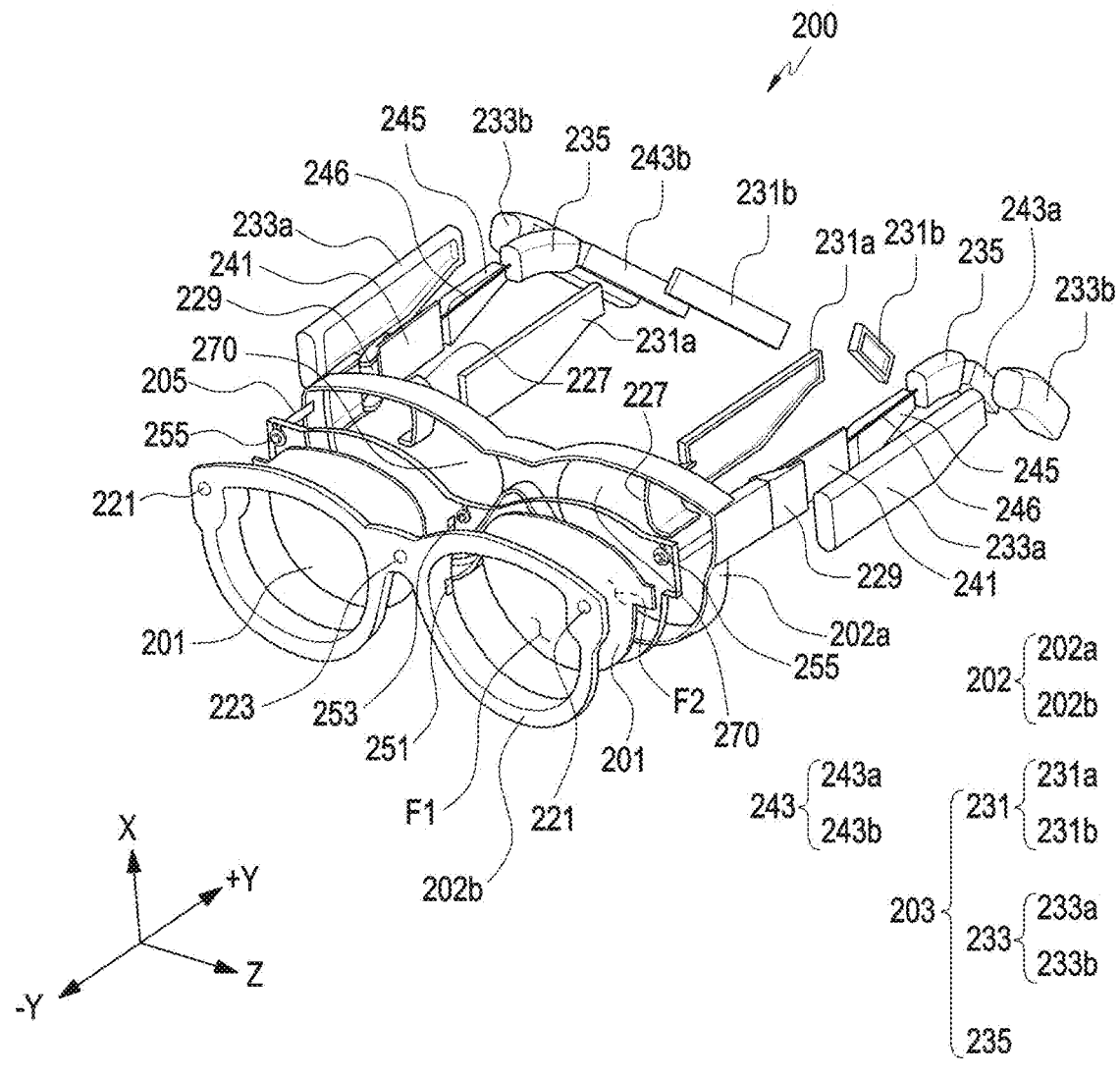
FIG. 2C is an exploded perspective view of a wearable device (e.g., an electronic device) according to an embodiment of the disclosure.

FIG. 2C is an exploded perspective view of a wearable device according to an embodiment of the disclosure.

Referring to FIGS. 2B and 2C, the wearable device 200 may include components (e.g., at least one circuit board 241 (e.g., printed circuit board (PCB), printed board assembly (PBA), flexible PCB (FPCB), or rigid-flexible PCB (RFPCB)), at least one battery 243, at least one speaker module 245, at least one power transmission structure 246, and/or a camera module 250) accommodated in the housing 210. The configuration of the housing 210 of FIG. 2B may be the same in whole or in part as the configuration of the display member 201, the lens frame 202, the wearing member 203, and the hinge structure 229 of FIG. 2A.

According to various embodiments, the wearable device 200 may obtain and/or recognize a visual image of an object or environment viewed by the user or in a direction (e.g., −Y direction) directed by the wearable device 200 by using the camera module 250 (e.g., the camera module 180 of FIG. 1) and receive information on an object or environment from an external electronic device (e.g., the electronic devices 102 and 104 or the server 108 of FIG. 1) through a network (e.g., the first network 198 or the second network 199 of FIG. 1). In an embodiment, the wearable device 200 may provide the provided information on an object or environment to the user in a sound or visual form. The wearable device 200 may provide the provided information on an object or environment to the user through the display member 201 in a visual form by using a display module (e.g., the display module 160 of FIG. 1). For example, the wearable device 200 may implement augmented reality by implementing information on an object or environment in a visual form and combining it with an actual image of the user's surrounding environment.

According to various embodiments, the display member 201 may include a first surface F1 facing a direction in which external light is incident (e.g., −Y direction) and a second surface F2 facing a direction opposite to the first surface F1 (e.g., +Y direction). While the user wears the wearable device 200, at least a portion of light or image incident through the first surface F1 may pass through the second surface F2 of the display member 201 disposed to face the user's left eye and/or right eye and may be incident into the user's left eye and/or right eye.

According to various embodiments, the lens frame 202 may include at least two frames. For example, the lens frame 202 may include a first frame 202a and a second frame 202b. According to an embodiment, when the user wears the wearable device 200, the first frame 202a is a frame of a portion facing the user's face, and the second frame 202b may be a portion of the lens frame 202 spaced apart from the first frame 202a in a gaze direction (e.g., −Y direction) that the user looks at with respect to the first frame 202a.

According to various embodiments, a light output module 211 may provide an image and/or a video to a user. For example, the light output module 211 may include a display panel (not illustrated) capable of outputting an image, and a lens (not illustrated) that corresponds to the user's eyes and guides the image to the display member 201. For example, the user may obtain an image output from the display panel of the light output module 211 through the lens of the light output module 211. According to various embodiments, the light output module 211 may include a device configured to display various information. For example, the light output module 211 may include at least one of a liquid crystal display (LCD), a digital mirror display (DMD), a liquid crystal on silicon (LCoS), an organic light emitting diode (OLED), or a micro light emitting diode (micro LED). According to an embodiment, when the light output module 211 and/or the display member 201 include one of an LCD, a DMD, or an LCOS, the wearable device 200 may include a light source that irradiates light to the display area of the light output module 211 and/or the display member 201. According to an embodiment, when the light output module 211 and/or the display member 201 includes either an OLED or a micro LED, the wearable device 200 may provide a virtual image to a user without including a separate light source.

According to various embodiments, at least a portion of the light output module 211 may be disposed in the housing 210. For example, the light output module 211 may be disposed on the wearing member 203 or the lens frame 202 to correspond to the user's right eye and left eye, respectively. According to an embodiment, the light output module 211 may be connected to the display member 201 and may provide an image to a user through the display member 201.

According to various embodiments, the circuit board 241 may include components for driving the wearable device 200. For example, the circuit board 241 may include at least one integrated circuit chip, and at least one of the processor 120, memory 130, the power management module 188, or the communication module 190 of FIG. 1 may be provided to the integrated circuit chip. According to an embodiment, the circuit board 241 may be disposed in the wearing member 203 of the housing 210. According to an embodiment, the circuit board 241 may be electrically connected to the battery 243 through a power transmission structure 246. According to an embodiment, the circuit board 241 may be connected to the flexible printed circuit board 205 and may transmit electronic signals to electronic components (e.g., the light output module 211, the camera module 250, and the light emitting unit) of the electronic device through the flexible printed circuit board 205. According to an embodiment, the circuit board 241 may be a circuit board including an interposer.

According to various embodiments, the flexible printed circuit board 205 may extend from the circuit board 241 to the inside of the lens frame 202 across the hinge structure 229, and may be disposed on at least a portion of the periphery of the display member 201 inside the lens frame 202.

According to various embodiments, the battery 243 (e.g., the battery 189 of FIG. 1) may be electrically connected to components of the wearable device 200 (e.g., the light output module 211, the circuit board 241, the speaker module 245, the microphone module 247, and/or the camera module 250), and may supply power to the components of the wearable device 200.

According to various embodiments, at least a portion of the battery 243 may be disposed on the wearing member 203. According to an embodiment, the battery 243 may be disposed on the ends 203*a* and 203*b* of the wearing member 203. For example, the battery 243 may include a first battery 243*a* disposed on the first end 203*a* and a second battery 243*b* disposed on the second end 203*b* of the wearing member 203.

According to various embodiments, the speaker module 245 (e.g., the audio module 170 or the sound output module 155 of FIG. 1) may convert an electrical signal into sound. At least a portion of the speaker module 245 may be disposed in the wearing member 203 of the housing 210. According to an embodiment, the speaker module 245 may be positioned in the wearing member 203 to correspond to the user's ear. For example, the speaker module 245 may be disposed between the circuit board 241 and the battery 243.

According to various embodiments, the power transmission structure 246 may transmit the power of the battery 243 to an electronic component (e.g., the light output module 211) of the wearable device 200. For example, the power transmission structure 246 may be electrically connected to the battery 243 and/or the circuit board 241, and the circuit board 241 may transmit the power received through the power transmission structure 246 to the light output module 211. According to an embodiment, the power transmission structure 246 may be connected to the circuit board 241 through the speaker module 245. For example, when the wearable device 200 is viewed from the side (e.g., the Z-axis direction), the power transmission structure 246 may at least partially overlap the speaker module 245.

According to various embodiments, the power transmission structure 246 may be a configuration capable of transmitting power. For example, the power transmission structure 246 may include a flexible printed circuit board or a wire. For example, the wire may include a plurality of cables (not illustrated). In various embodiments, the shape of the power transmission structure 246 may be variously modified in consideration of the number and/or type of cables.

According to various embodiments, a microphone module 247 (e.g., the input module 150 and/or the audio module 170 of FIG. 1) may convert sound into an electrical signal. According to an embodiment, the microphone module 247 may be disposed on at least a portion of the lens frame 202. For example, at least one microphone module 247 may be disposed on the lower end (e.g., in the direction toward the −X axis) and/or the upper end (e.g., in the direction toward the X axis) of the wearable device 200. According to various embodiments, the wearable device 200 may more clearly recognize a user's voice by using voice information (e.g., sound) obtained from at least one microphone module 247. For example, the wearable device 200 may distinguish voice information from ambient noise based on the obtained voice information and/or additional information (e.g., low-frequency vibration of the user's skin and bones). For example, the wearable device 200 may clearly recognize the user's voice and perform a function of reducing ambient noise (e.g., noise cancellation). The microphone module 247 according to various embodiments of the disclosure may include a plurality of microphone modules 247 to perform beamforming. The microphone module 247 according to various embodiments of the disclosure may include an omnidirectional or directional microphone.

According to various embodiments, the camera module 250 may capture a still image and/or a moving image. The camera module 250 may include at least one of a lens, at least one image sensor, an image signal processor, or a flash. According to an embodiment, the camera module 250 may be disposed within the lens frame 202, and may be disposed around the display member 201.

According to various embodiments, the camera module 250 may include at least one first camera module 251. According to an embodiment, the first camera module 251 may capture the trajectory of the user's eyes (e.g., a pupil) or gaze. For example, the first camera module 251 may capture a reflection pattern of light emitted by the light emitting unit to the user's eyes. For example, the light emitting unit may emit light in an infrared band for tracking the trajectory of the gaze using the first camera module 251. For example, the light emitting unit may include an IR LED. According to an embodiment, the processor (e.g., the processor 120 of FIG. 1) may adjust the position of a virtual image so that the virtual image projected on the display member 201 corresponds to the direction in which the user's pupils gaze. According to an embodiment, the first camera module 251 may include a global shutter (GS) type camera, and may track the trajectory of the user's eyes or gaze by using a plurality of first camera modules 251 having the same standard and performance.

According to various embodiments, the first camera module 251 may periodically or aperiodically transmit information (e.g., trajectory information) related to the trajectory of the user's eye or gaze to the processor (e.g., processor 120 of FIG. 1). According to an embodiment, the first camera module 251 may transmit trajectory information to the processor when detecting that the user's gaze has changed (e.g., the eye moves above a reference value while the head is not moving) based on the trajectory information.

According to various embodiments, the camera module 250 may include a second camera module 253. According to an embodiment, the second camera module 253 may capture an external image. According to an embodiment, the second camera module 253 may be a global shutter type or a rolling shutter (RS) type camera. According to an embodiment, the second camera module 253 may capture an external image through the second optical hole 223 formed in the second frame 202*b*. For example, the second camera module 253 may include a high-resolution color camera, and may be a high-resolution (HR) or photo video (PV) camera. In addition, the second camera module 253 may provide an auto-focus (AF) function and an optical image stabilizer (OIS).

According to various embodiments, the wearable device 200 may include a flash (not illustrated) disposed adjacent to the second camera module 253. For example, when obtaining an external image of the second camera module 253, the flash (not illustrated) may provide light to increase the brightness (e.g., illuminance) around the wearable device 200, and may reduce difficulty in obtaining an image due to a dark environment, mixing of various light sources, and/or reflection of light.

According to various embodiments, the camera module 250 may include at least one third camera module 255. According to an embodiment, the third camera module 255 may capture a user's motion through the first optical hole 221 formed in the lens frame 202. For example, the third camera module 255 may capture a user's gesture (e.g., a hand gesture). The third camera module 255 and/or the first optical hole 221 may be disposed on both ends of the lens frame 202 (e.g., the second frame 202b), for example, on both ends of the lens frame 202 (e.g., the second frame 202b) in the X direction, respectively. According to an embodiment, the third camera module 255 may be a global shutter (GS) type camera. For example, the third camera module 255 may provide 360-degree space (e.g., all direction), position recognition, and/or movement recognition with a camera supporting 3DoF (degrees of freedom) or 6DoF. According to an embodiment, the third camera module 255 may perform a movement path tracking function (simultaneous localization and mapping (SLAM)) and a user motion recognition function by using multiple global shutter type cameras of the same standard and performance with a stereo camera. According to an embodiment, the third camera module 255 may include an infrared (IR) camera (e.g., a time of flight (TOF) camera, or a structured light camera). For example, the IR camera may operate as at least a portion of a sensor module (e.g., the sensor module 176 of FIG. 1) for detecting a distance to a subject.

According to various embodiments, at least one of the first camera module 251 or a third camera module 255 may be replaced with a sensor module (e.g., the sensor module 176 of FIG. 1) (e.g., a light detection and ranging (LiDAR) sensor). For example, the sensor module may include at least one of a vertical cavity surface emitting laser (VCSEL), an infrared sensor, and/or a photodiode. For example, the photodiode may include a positive intrinsic negative (PIN) photodiode, or an avalanche photodiode (APD). The photodiode may be referred to as a photo detector, or a photo sensor.

According to various embodiments, at least one of the first camera module 251, the second camera module 253, or the third camera module 255 may include a plurality of camera modules (not illustrated). For example, the second camera module 253 may be composed of a plurality of lenses (e.g., wide-angle and telephoto lenses) and image sensors and may be disposed on one side (e.g., the side facing the −Y axis) of the wearable device 200. For example, wearable device 200 may include a plurality of camera modules each having different properties (e.g., angles of view) or functions, and control to change the angle of view of the camera module based on the user's selection and/or trajectory information. For example, at least one of the plurality of camera modules may be a wide-angle camera, and at least the other may be a telephoto camera.

According to various embodiments, the processor (e.g., the processor 120 of FIG. 1) may determine the movement of the wearable device 200 and/or the user's movement by using information on the wearable device 200 obtained using at least one of a gesture sensor, a gyro sensor, or an acceleration sensor of the sensor module (e.g., the sensor module 176 of FIG. 1) and the user's motion (e.g., access of the user's body to the wearable device 200) obtained using the second camera module 253. According to an embodiment, in addition to the described sensor, the wearable device 200 may include a magnetic (geomagnetic) sensor capable of measuring the orientation by using a magnetic field and a magnetic line, and/or a Hall sensor capable of obtaining motion information (e.g., a moving direction or a moving distance) by using the strength of the magnetic field. For example, the processor may determine the movement of the wearable device 200 and/or the movement of the user based on information obtained from the magnetic (geomagnetic) sensor and/or the Hall sensor.

According to various embodiments (not illustrated), the wearable device 200 may perform an input function (e.g., a touch, and/or a pressure sensing function) capable of interacting with a user. For example, a component (e.g., a touch sensor, and/or a pressure sensor) configured to perform a touch and/or pressure sensing function may be disposed on at least a portion of the wearing member 203. The wearable device 200 may control a virtual image output through the display member 201 based on the information obtained through the component. For example, sensors related to touch and/or pressure sensing functions may be configured in various ways, such as a resistive type, a capacitive type, an electromagnetic type (EM), or an optical type. According to an embodiment, components configured to perform the touch and/or pressure sensing function may be the same in whole or in part as the configuration of the input module 150 of FIG. 1.

According to various embodiments, the wearable device 200 may include a reinforcing member 260 disposed in the inner space of the lens frame 202 and formed to have a rigidity higher than the rigidity of the lens frame 202.

According to various embodiments, the wearable device 200 may include a lens structure 270. The lens structure 270 may refract at least a portion of light. For example, the lens structure 270 may be a prescription lens having refractive power. According to an embodiment, the lens structure 270 may be disposed behind the second window member of the display member 201 (e.g., in the +Y direction). For example, the lens structure 270 may be positioned between the display member 201 and the user's eyes. For example, the lens structure 270 may face the display member.

According to various embodiments, the housing 210 may include a hinge cover 227 capable of concealing a portion of the hinge structure 229. Another portion of the hinge structure 229 may be accommodated or concealed between the inner case 231 and the outer case 233 to be described later.

According to various embodiments, the wearing member 203 may include the inner case 231 and the outer case 233. The inner case 231 is a case configured to face the user's body or directly contact the user's body, and may be made of a material having low thermal conductivity, for example, synthetic resin. According to an embodiment, the inner case 231 may include an inner side surface (e.g., the inner side surface 231c of FIG. 2A) facing the user's body. The outer case 233 includes, for example, a material (e.g., a metallic material) capable of at least partially transferring heat, and may be coupled to face the inner case 231. According to an embodiment, the outer case 233 may include an outer side surface (e.g., the outer side surface 231d of FIG. 2A) opposite the inner side surface 231c. In an embodiment, at least one of the circuit board 241 or the speaker module 245 may be accommodated in a space separated from the battery 243 within the wearing member 203. In the illustrated embodiment, the inner case 231 may include a first case 231a including the circuit board 241 or the speaker module 245 and a second case 231b accommodating the battery 243, and the outer case 233 may include a third case 233*a* coupled to face the first case 231*a* and a fourth case 233*b* coupled to face the second case 231*b*. For example, the first case 231*a* and the third case 233*a* may be coupled to each other (hereinafter, 'the first case parts 231*a* and 233*a*') to accommodate the circuit board 241 and/or the speaker module 245, and the second case 231*b* and the fourth case 233*b* may be coupled to each other (hereinafter, 'the second case parts 231*b* and 233*b*') to accommodate the battery 243.

According to various embodiments, the first case parts 231*a* and 233*a* may be rotatably coupled to the lens frame 202 through the hinge structure 229, and the second case parts 231*b* and 233*b* may be connected or mounted to ends of the first case parts 231*a* and 233*a* through a connecting member 235. In an embodiment, a portion of the connecting member 235 in contact with the user's body may be made of a material having low thermal conductivity, for example, an elastic material such as silicone, polyurethane, or rubber, and a portion that is not in contact with the user's body may be made of a material having high thermal conductivity (e.g., a metallic material). For example, when heat is generated from the circuit board 241 or the battery 243, the connecting member 235 may block the transfer of heat to the portion that is in contact with the user's body and distribute or release heat through the portion that is not in contact with the user's body. According to an embodiment, the portion of the connecting member 235 configured to be in contact with the user's body may be interpreted as a portion of the inner case 231, and the portion of the connecting member 235 that is not in contact with the user's body may be interpreted as a portion of the outer case 233. According to an embodiment (not illustrated), the first case 231*a* and the second case 231*b* may be integrally configured without the connecting member 235, and the third case 233*a* and the fourth case 233*b* may be integrally configured without the connecting member 235. According to various embodiments, other components (e.g., the antenna module 197 of FIG. 1) may be further included in addition to the illustrated components, and information on objects or environments may be provided from an external electronic device (e.g., the electronic devices 102 and 104 or the server 108 of FIG. 1) through a network (e.g., the first network 198 or the second network 199 of FIG. 1) by using the communication module 190.

Although only the wearable device 200 is illustrated and described in FIGS. 2A to 2C, it is not limited thereto, and some components of the wearable device 200 illustrated in FIGS. 2A to 2C may also be included in electronic devices such as smartphones and tablet PCs.

The wearable device 200 according to various embodiments may identify whether the user is wearing the wearable device 200 through a proximity sensor included in the wearable device 200. Alternatively, the wearable device 200 according to various embodiments of the disclosure may determine whether the wearable device 200 is worn on the user based on whether the frame of the wearable device 200 is unfolded (e.g., in an unfolded state) and whether the proximity of the user is detected while the frame of the wearable device 200 is unfolded through an angle sensor provided in the hinge portion of the wearable device 200.

Figure 3:
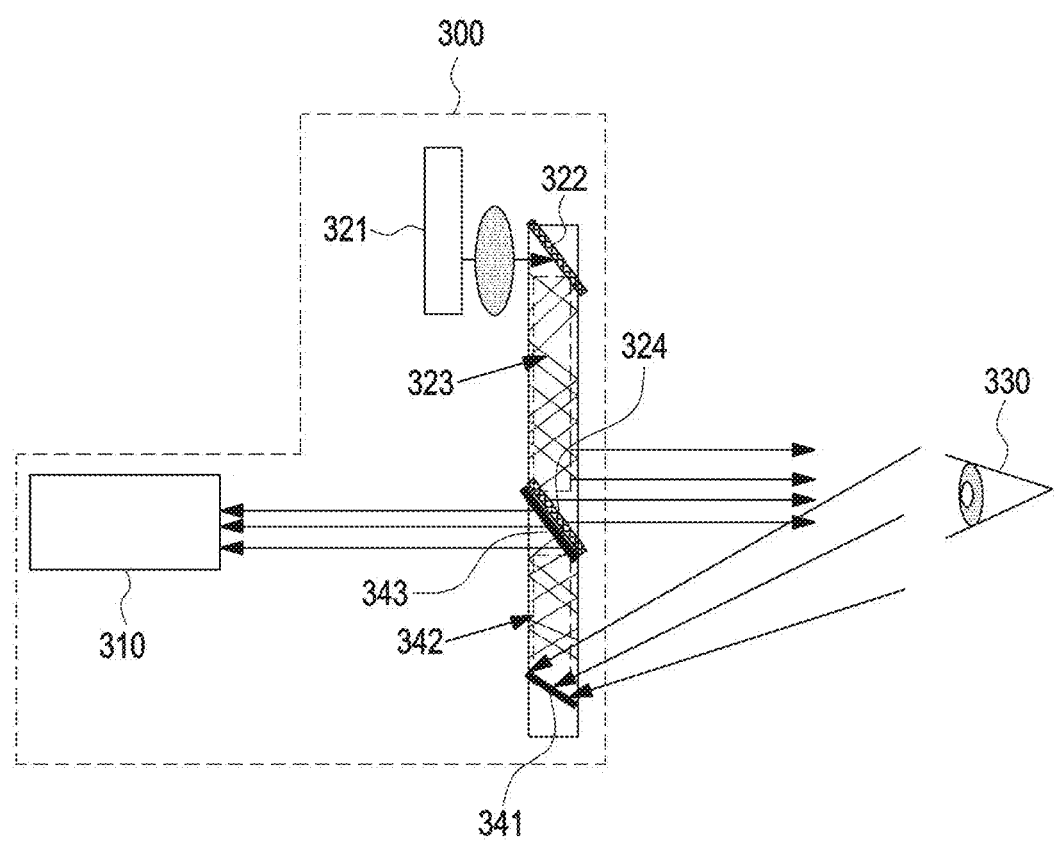
FIG. 3 illustrates an eye tracking camera structure of a wearable device according to an embodiment of the disclosure.

FIG. 3 illustrates an eye tracking camera structure of a wearable device according to an embodiment of the disclosure.

Referring to FIG. 3, the wearable device 300 (e.g., a glasses-type device) may include an eye tracking (ET) camera 310, a display 321, an input optical member 322, a first waveguide 323, an output optical member 324, a first splitter 341, a second waveguide 342, and a second splitter 343.

According to various embodiments, the user's pupil 330 may be captured by the ET camera 310 through the first splitter 341 (e.g., a splitter for eye tracking), the second waveguide 342, and the second splitter 343. The ET camera 310 may track the user's gaze by detecting the pupil 330 in the captured image and identifying the detected movement of the pupil 330.

According to various embodiments, the image output through the display 321 may be reflected through the input optical member 322 and the first waveguide 323 and displayed through the output optical member 324. The wearable device 300 may output an image through the display 321 and simultaneously track the user's gaze by identifying the movement of the user's pupils 330.

Figure 4:
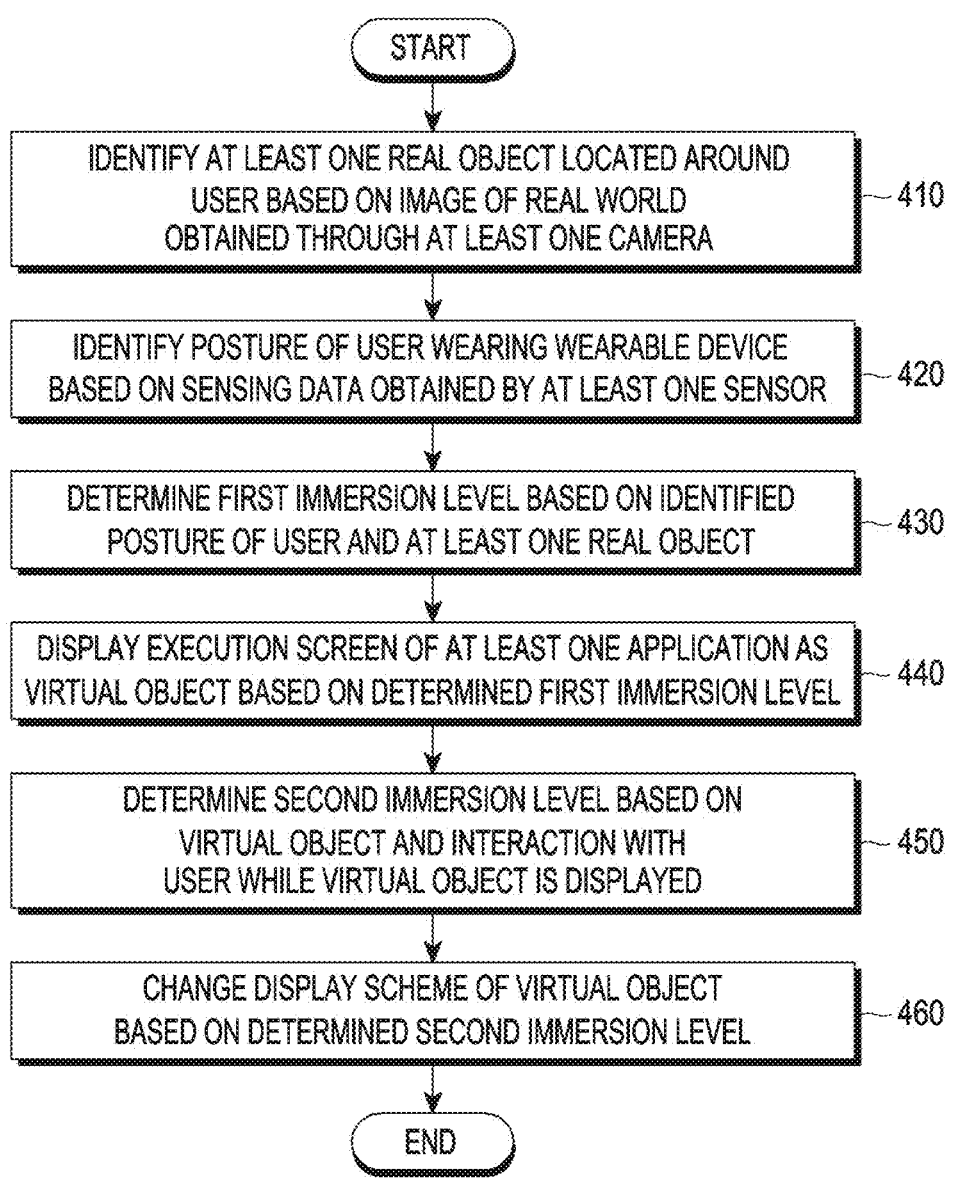
FIG. 4 is a diagram illustrating a function or operation of providing a virtual object to a user based on a first immersion level and a second immersion level by a wearable device according to an embodiment of the disclosure.

FIG. 4 is a diagram illustrating a function or operation of providing a virtual object (e.g., a first application execution screen 530) to a user based on immersion levels (e.g., a first immersion level and a second immersion level) by a wearable device 200 according to an embodiment of the disclosure.

Figure 5A:
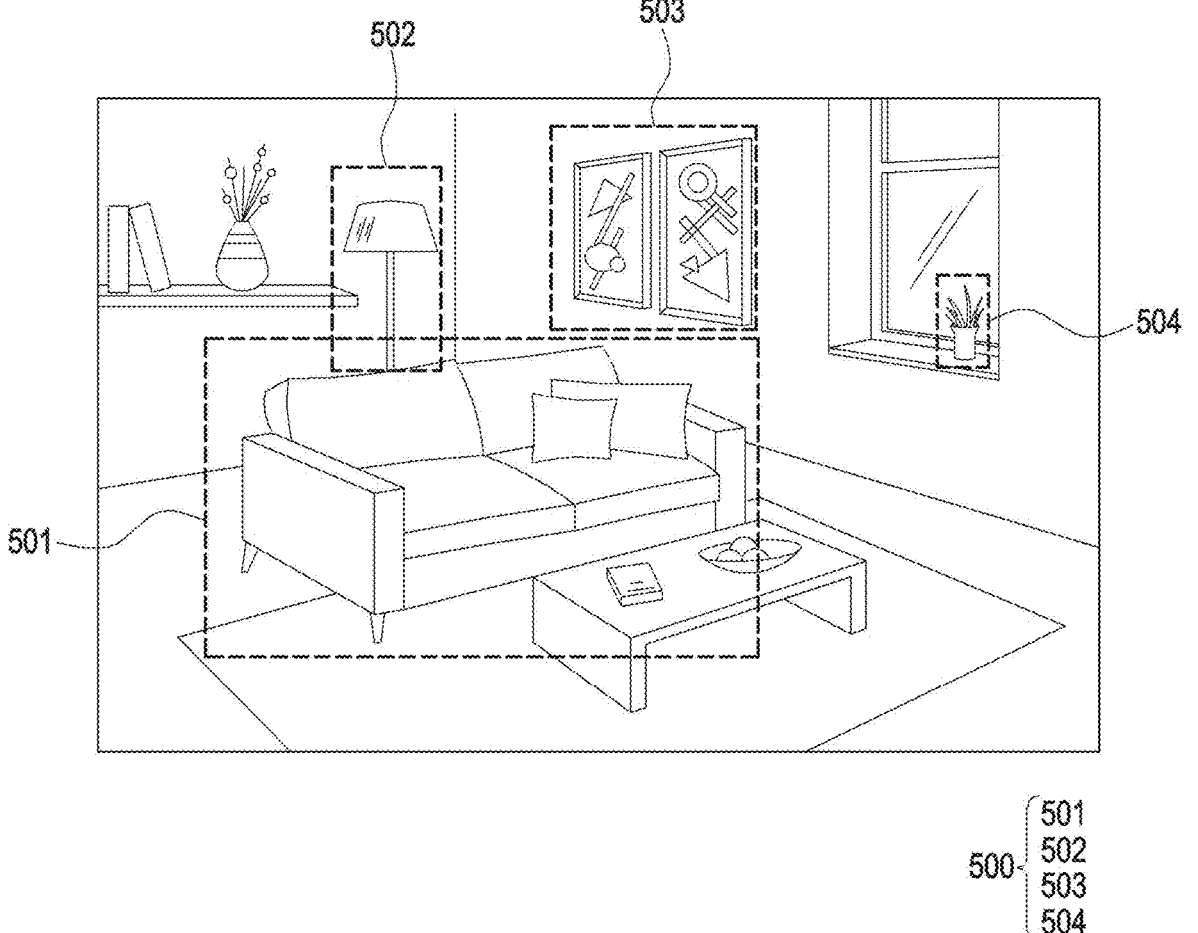
FIGS. 5A, 5B, and 5C are diagrams illustrating a function or operation of displaying a virtual object (e.g., an execution screen of a gallery application) according to a first immersion level (e.g., level 4 as an initial level) from a user interface perspective by a wearable device according to various embodiments of the disclosure.
Figure 5B:
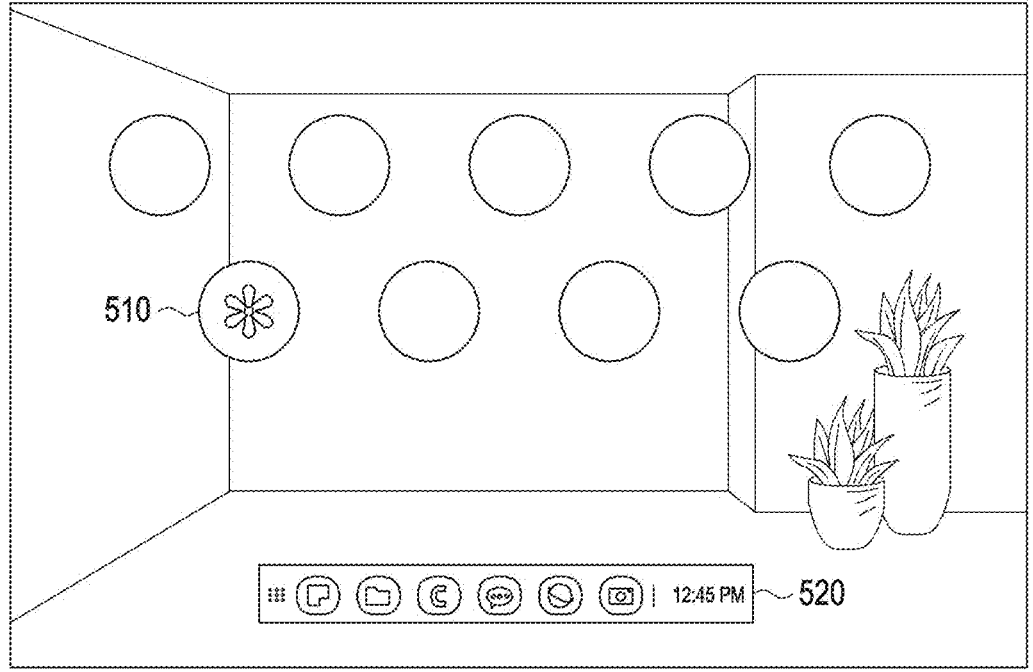
Figure 5C:
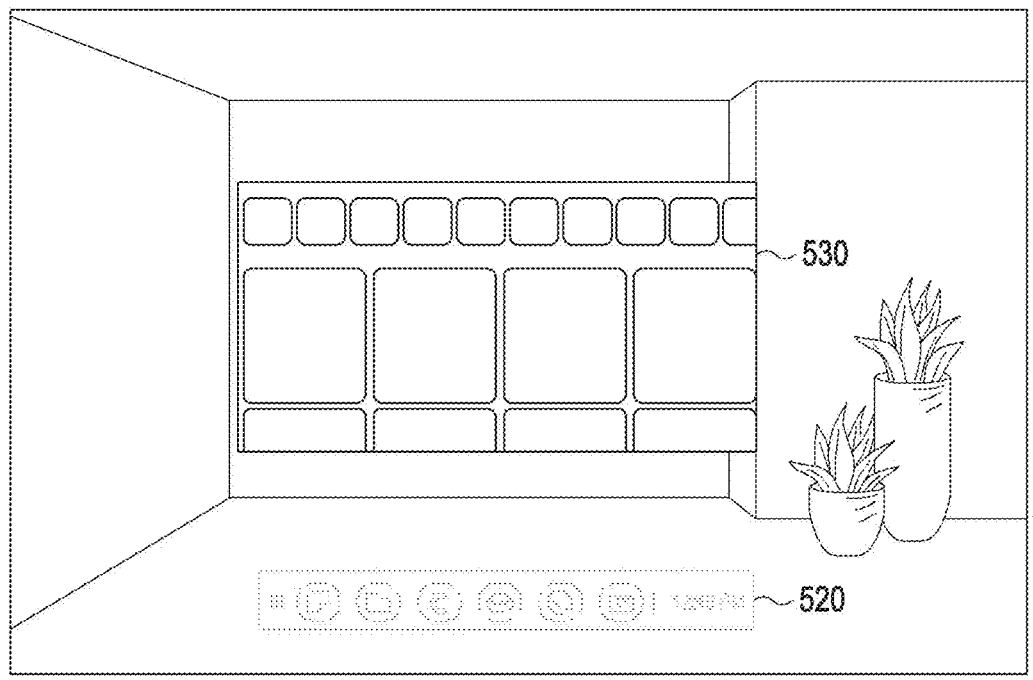

FIGS. 5A to 5C are diagrams illustrating a function or operation of displaying a virtual object (e.g., an execution screen of a gallery application) according to a first immersion level (e.g., level 4 as an initial level) from a user interface perspective by a wearable device according to various embodiments of the disclosure.

Figure 6A:
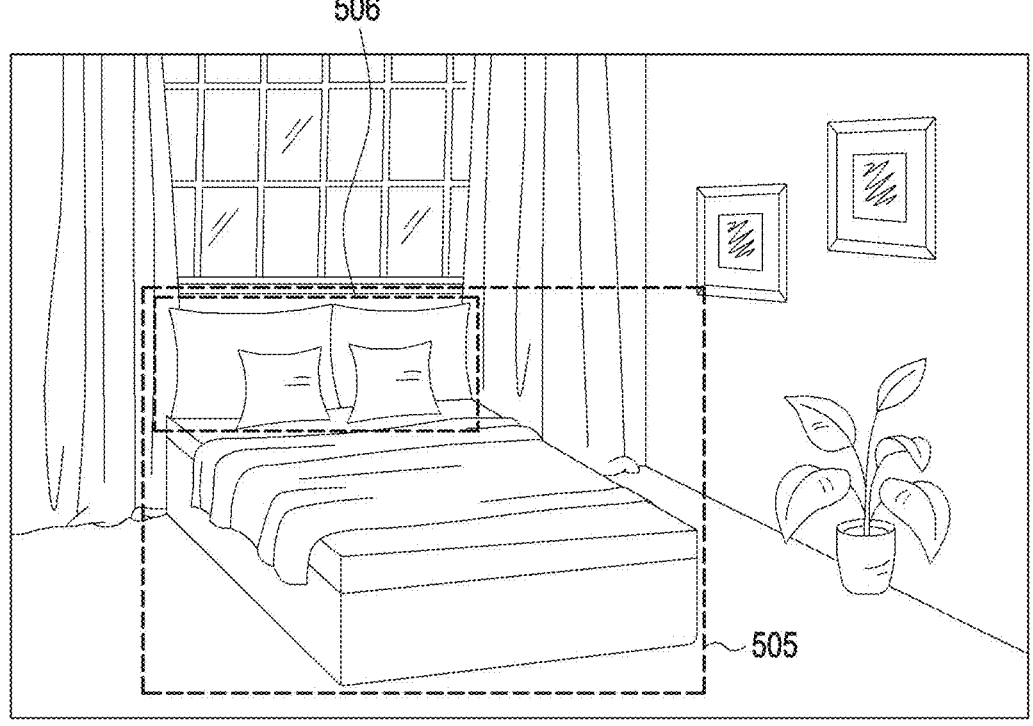
FIGS. 6A, 6B, and 6C are diagrams illustrating a function or operation of displaying a virtual object (e.g., an execution screen of a gallery application) according to a first immersion level (e.g., level 6 as an initial level) from a user interface perspective by a wearable device according to various embodiments of the disclosure.
Figure 6B:
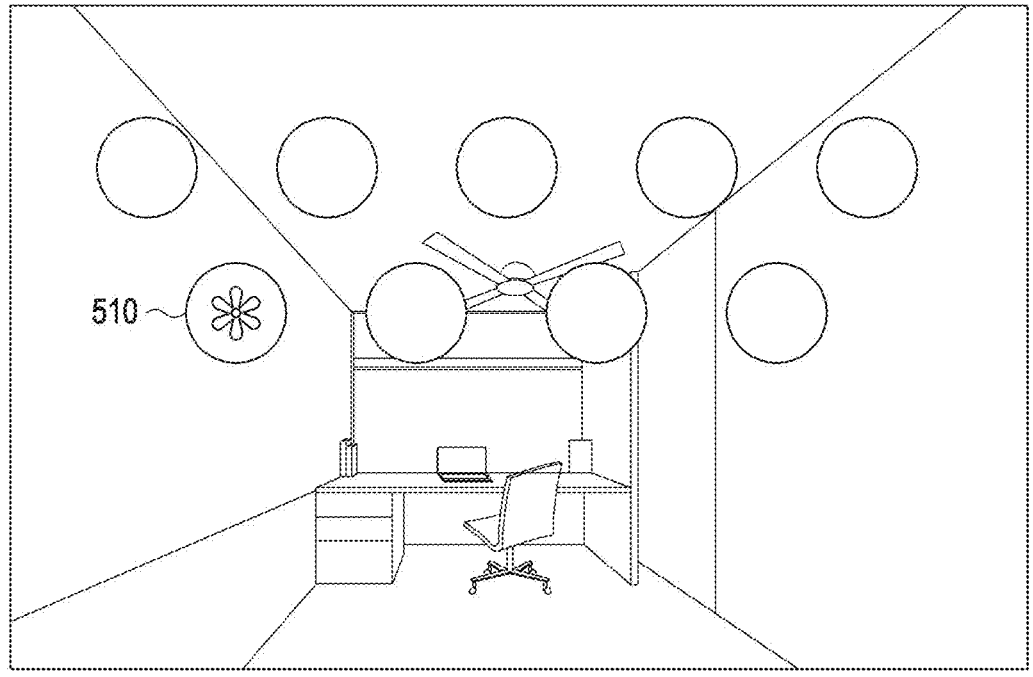
Figure 6C:
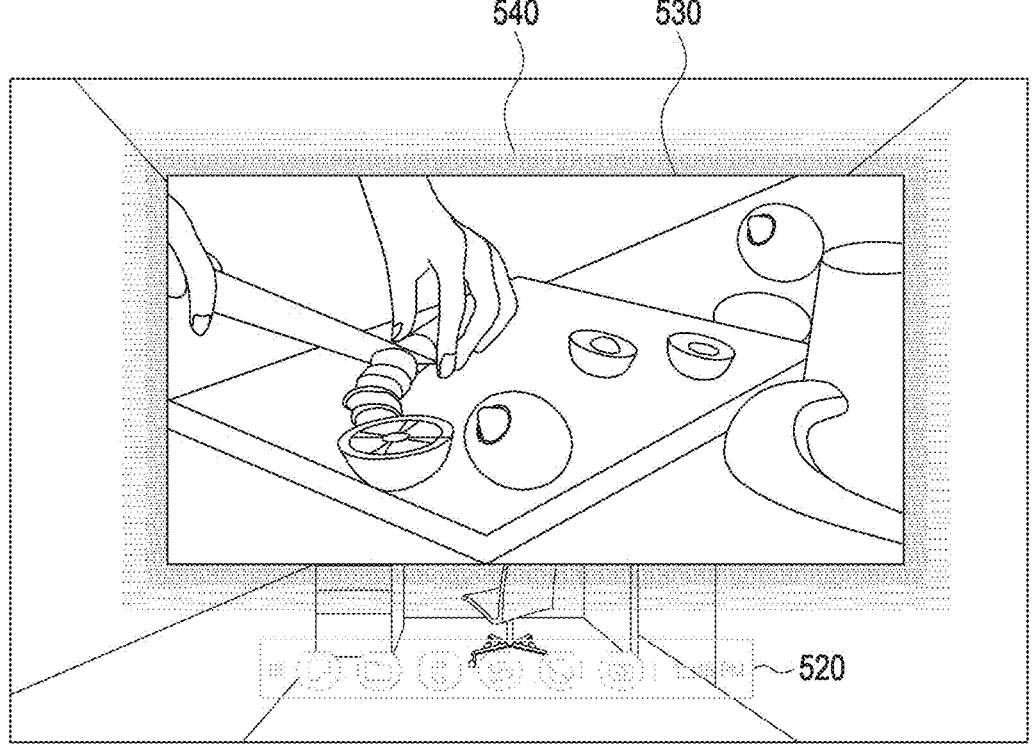

FIGS. 6A, 6B, and 6C are diagrams illustrating a function or operation of displaying a virtual object (e.g., an execution screen of a gallery application) according to a first immersion level (e.g., level 6 as an initial level) from a user interface perspective by a wearable device according to various embodiments of the disclosure.

Depending on the immersive score or immersion level mentioned in the disclosure, the display properties of a virtual object (e.g., the execution screen of a gallery application) may be changed, or the surroundings of the virtual object (e.g., the execution screen of a gallery application) may be changed to virtual reality. The term immersion level mentioned in the disclosure may be an immersion environment determination model used to change the properties of a virtual object (e.g., the first application execution screen 530) and/or surroundings of the virtual object (e.g., the first application execution screen 530) shown to the user in a specified manner (e.g., a pass-through manner). For example, as the immersion level according to an embodiment of disclosure increases, the properties (e.g., resolution and/or size) of the virtual object (e.g., the first application execution screen 530) being shown to the user in a pass-through manner may change, or at least some of the environments around the virtual object (e.g., the first application execution screen 530) may change to a virtual reality environment. The immersion level according to an embodiment of disclosure may be determined by an immersion level determination logic 1960. In addition, based on the immersion level according to an embodiment of disclosure, a function or operation of the wearable device 200 to display a virtual object may be performed by an immersion level reflection logic 1970.

Referring to FIGS. 4, 5A, 5B, and 5C, and 6A, 6B, and 6C, in operation 410, the wearable device 200 according to an embodiment of the disclosure may identify at least one real object 500 located around a user wearing the wearable device 200 based on an image of the real world obtained through at least one camera (e.g., the second camera module 253). The wearable device 200 (e.g., the processor 120 of FIG. 1) according to an embodiment of the disclosure may identify the current location (e.g., a living room) where the user wearing the wearable device 200 is located by identifying at least one real object 500 (e.g., a sofa 501, a light 502, a picture frame 503, a flowerpot 504) located around the user. The wearable device 200 according to an embodiment of the disclosure may obtain or infer information on a place where the user is currently located based on the at least one identified real object 500 by using a pre-stored database and/or a generative artificial intelligence. For example, the wearable device 200 according to an embodiment of the disclosure may identify or infer that the user wearing the wearable device 200 is currently located in the living room by identifying the sofa 501, the light 502, the picture frame 503, and the flowerpot 504. The wearable device 200 (e.g., the processor 120 of FIG. 1) according to an embodiment of the disclosure may identify the current place (e.g., bedroom) where the user wearing the wearable device 200 is located by identifying at least one real object 500 (e.g., a bed 505, a pillow 506) located around the user. For example, the wearable device 200 according to an embodiment of the disclosure may identify or infer that the user wearing the wearable device 200 is currently located in the bedroom by identifying the bed 505 and the pillow 506. The wearable device 200 according to an embodiment of the disclosure may also determine a place where the user is currently located by using (e.g., through communication with a real object around the user) short-range communication (e.g., NFC, Wi-Fi (wireless fidelity) direct). The function or operation of the wearable device 200 according to an embodiment of the disclosure to recognize a real object may be performed by an object recognition logic 1942. In addition, the function or operation of recognizing the location of the wearable device 200 may be performed by a location information recognition logic 1944.

In operation 420, the wearable device 200 according to an embodiment of the disclosure may identify the posture of the user wearing the wearable device 200 based on sensing data obtained by at least one sensor (e.g., the sensor module 176 of FIG. 1 and/or at least one camera). The function or operation of identifying the posture of the user according to an embodiment of the disclosure may be performed by, for example, a posture recognizer 1932. The wearable device 200 according to an embodiment of the disclosure may identify or infer the user's current posture by using information such as a lookup table in which a relationship between sensing data and the user's posture is defined. For example, the wearable device 200 according to an embodiment of the disclosure may identify that the user is currently seated on the sofa 501 by using images obtained by at least one camera (e.g., the second camera module 253) and sensing data obtained by an acceleration sensor and/or a gyro sensor. Referring to FIG. 5B, a state in which a user wearing the wearable device 200 is seated on the sofa 501 is exemplarily illustrated. After the execution of operations 410 and 420 is completed, the wearable device 200 according to an embodiment of the disclosure may display a home screen including at least one application shortcut icon (e.g., a first icon 510) and a tray 520 displaying at least one application icon on the real world as a virtual object. Alternatively, regardless of the performance of the operations 410 and 420, the wearable device 200 according to an embodiment of the display may display the home screen including at least one application shortcut icon (e.g., the first icon 510) and the tray 520 displaying at least one application icon on the real world as a virtual object after the user's wearing of the wearable device 200 is detected. In FIG. 5B, an embodiment in which the home screen is displayed after the user sits down is exemplarily illustrated.

Referring to FIG. 6B, the wearable device 200 according to an embodiment of the disclosure may identify or infer that the user is currently lying on the bed 505 by using images obtained by at least one camera (e.g., the second camera module 253) and sensing data obtained by the acceleration sensor and/or the gyro sensor. After identifying the user's posture, the wearable device 200 according to an embodiment of the disclosure may display a home screen including at least one application shortcut icon (e.g., the first icon 510) and the tray 520 displaying at least one application icon on the real world as a virtual object.

In operation 430, the wearable device 200 according to an embodiment of the disclosure may determine a first immersion level (e.g., an initial level) based on the real object identified according to operation 410 and/or the posture of the user identified according to operation 420. However, the function or operation of determining the first immersion level based on the real object identified according to operation 410 and/or the posture of the user identified according to operation 420 is an example illustrating various embodiments of the disclosure. According to an embodiment of the disclosure, the first immersion level may be determined based on the type of the application being executed. For example, when the type of the application being executed is an immersive application (e.g., a gallery application), the wearable device 200 according to an embodiment of the disclosure may display a virtual object (e.g., the execution screen of the gallery application) in a real world (e.g., with the first immersion level designated as 1), and when the type of the application being executed is an experiential application (e.g., a game application), the wearable device 200 may display a virtual object (e.g., the execution screen of the game application) in a complete virtual reality (e.g., with the immersion level designated as 10). In operation 440, the wearable device 200 according to an embodiment of the disclosure may display an execution screen (e.g., an application execution screen 530) of at least one application as a virtual object based on the determined first immersion level. The wearable device 200 according to an embodiment of the disclosure may calculate an immersive score based on the current position and/or posture of the user wearing the wearable device 200. The wearable device 200 according to an embodiment of the disclosure may determine an immersive score based on information such as the table illustrated in FIG. 7A.

FIG. 7A is a diagram illustrating an immersive score for determining an immersion level (e.g., a first immersion level and/or a second immersion level) according to an embodiment of the disclosure.

Referring to FIG. 7A, when a user is seated on the sofa 501 in a resting environment (e.g., a living room), the wearable device 200 according to an embodiment of the disclosure may determine the immersive score as 4 points by using the information illustrated in FIG. 7A and the equation 1 below. As illustrated in FIG. 7A, if the criteria for determining the immersive score are determined differently depending on the type of the application (e.g., whether it is an appreciation-type application such as a gallery application or an experiential application such as a game application), the wearable device 200 according to an embodiment of the disclosure may calculate an immersive score for determining an immersion level (e.g., a first immersion level and/or a second immersion level) based on any one of the specified criteria (e.g., an immersive score calculation criterion for an appreciation-type application).

$$af(\alpha)) + bg(\beta) - ci(r) \qquad \text{Equation 1}$$

In Equation 1, f($\alpha$) may refer to a score function for a user's posture, and may include a function in which the score is high in the static state and the score is low in the dynamic state. In Equation 1, g($\beta$) may refer to a score function for a user's surrounding environment, and may include a function in which the score is determined according to the characteristics of a place. In Equation 1, i(r) may refer to an interrupt score function, and may include a function configured to lower the immersion level when a call requiring a user's response occurs. In Equation 1, a, b, and c may refer to weights between elements, and for example, a+b+c may be 1.

The wearable device 200 according to an embodiment of the disclosure may determine an immersion level based on the calculated immersive score.

FIG. 7B is a diagram illustrating an immersion level (e.g., a first immersion level and/or a second immersion level) according to an embodiment of the disclosure.

The immersive score and the immersion level according to an embodiment of the disclosure may be associated with each other and stored in the wearable device 200 and/or an external device. For example, the association may be designated as immersion level 1 when the immersive score is 1 point, and may be designated as immersion level 2 when the immersive score is 2 points. The function or operation of recognizing an external device according to an embodiment of the disclosure may be performed by an external device recognition logic 1946. Referring to FIG. 7B, for example, the immersion level is described assuming that multiple virtual objects (e.g., execution screens of multiple applications) are displayed as virtual objects, but the same may be applied to even when a single application execution screen is displayed as a virtual object. When the immersive score is calculated as 4 points, the wearable device 200 according to an embodiment of the disclosure may determine the first immersion level as a level 4. Referring to FIG. 5C, the wearable device 200 according to an embodiment of the disclosure may display a virtual object according to a virtual object display environment corresponding to the level 4. For example, the level 4 according to an embodiment of the disclosure may include a level indicating a state in which the size of the virtual object (e.g., the application execution screen) is enlarged by a specified ratio than the size initially displayed, and the tray 520 is displayed more blurry or darker than the initially configured brightness or sharpness. Referring to FIG. 5C, based on the virtual object being displayed according to the 4 levels, an embodiment is exemplified in which the tray 520 is displayed more blurry or darker than the initially configured brightness or sharpness, and the first application execution screen 530 is displayed larger than the initially configured size by a specified ratio while maintaining the resolution. The wearable device 200 according to an embodiment of the disclosure may display a virtual object by determining the size of the virtual object (e.g., how large to display) and/or the environment around the virtual object (e.g., whether to change to virtual reality) based on the immersion level corresponding to the immersive score. Referring to FIG. 6C, when the immersion level (e.g., the first immersion level) is designated as 6, the wearable device 200 according to an embodiment of the disclosure may display the size of the virtual object (e.g., the application execution screen) as a size enlarged by a specified ratio than the size initially displayed, and may change and display a first area having a specified area around the virtual object into virtual reality including a specified image. In addition, the wearable device 200 according to an embodiment of the disclosure may control the display module 160 such that the tray 520 is displayed more blurry or darker than the initially configured brightness or sharpness.

In operation 450, the wearable device 200 according to an embodiment of the disclosure may determine the second immersion level based on the virtual object and the interaction with the user while the virtual object is displayed. In operation 460, the wearable device 200 according to an embodiment of the disclosure may change the display scheme of the virtual object being displayed according to the first immersion level based on the determined second immersion level. The wearable device 200 according to an embodiment of the disclosure may determine the type of application currently being executed (e.g., based on an application characteristic determination logic 1952) to determine the second immersion level. For example, the wearable device 200 according to an embodiment of the disclosure may determine whether the application currently being executed is an appreciation application or an experiential application.

Figure 8A:
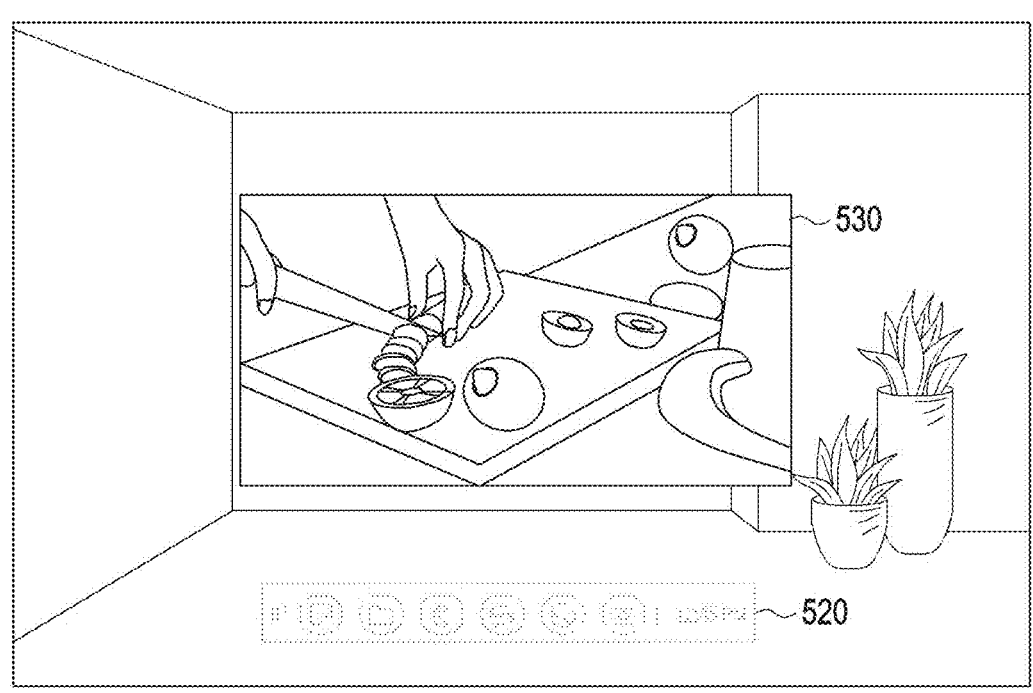
FIGS. 8A and 8B are diagrams illustrating a function or operation of changing a display scheme of a virtual object based on an immersion level that changes as an immersive score increases from a user interface perspective when the type of an application running in a wearable device is a first type application (e.g., an application for appreciation) according to various embodiments of the disclosure.
Figure 8B:
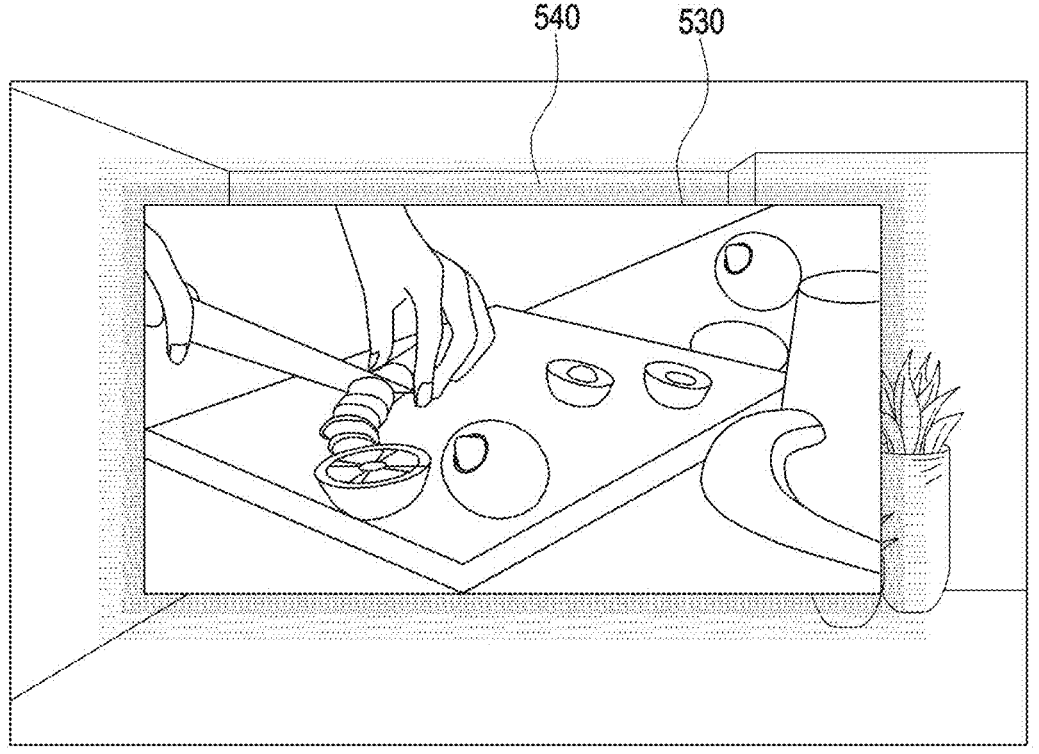

FIGS. 8A and 8B are diagrams illustrating a function or operation of changing a display scheme of a virtual object based on an immersion level that changes as an immersive score increases from a user interface perspective when the type of an application running in a wearable device 200 is a first type application (e.g., an application for appreciation) according to various embodiments of the disclosure.

Referring to FIG. 8A, the wearable device 200 according to an embodiment of the disclosure may display a virtual object and an interface according to a level 4, which is the first immersion level. The virtual object (e.g., the first application execution screen 530) according to an embodiment of the disclosure may be displayed in a pass-through manner while a user is wearing the wearable device 200. In other words, the virtual object (e.g., the first application execution screen 530) and the real world may be shown to the user simultaneously. As the immersion level mentioned in the disclosure increases (e.g., when the immersion level is increased from level 4 (e.g., the first immersion level) to level 6 (e.g., the second immersion level), the surroundings of a virtual object (e.g., the first application execution screen 530) shown to the user in a pass-through manner may be gradually and automatically (e.g., without a specified input to the user's wearable device 200) changed to a virtual reality environment. According to an embodiment of the disclosure, the virtual object (e.g., the first application execution screen 530) may also be moved according to the movement of the user's gaze (e.g., displayed with body-locked), and in this case, the virtual reality environment provided around the virtual object (e.g., the first application execution screen 530) may also be moved together according to the movement of the virtual object (e.g., the first application execution screen 530) and provided to the user. Alternatively, according to an embodiment of the disclosure, as the user's gaze moves, the display position of the virtual object (e.g., the first application execution screen 530) is fixedly displayed (e.g., displayed with world-locked), and only the virtual reality environment may be gradually provided according to the movement of the user's gaze. The user's gaze according to an embodiment of the disclosure may be tracked by, for example, a gaze tracker 1934.

When the wearable device 200 according to an embodiment of the disclosure identifies that the user's gaze is maintained on the first application execution screen 530 for a specified time or longer, the immersive score may be increased by 1 point for each specified time. Accordingly, for example, when the immersive score is changed from 4 (e.g., the immersive score corresponding to the first immersion level) to 6, the wearable device 200 according to an embodiment of the disclosure may display a virtual object in an immersive view state, as illustrated in FIG. 8B. For example, the wearable device 200 according to an embodiment of the disclosure may display the first application execution screen 530 by enlarging the first application execution screen 530 by a specified ratio or more than the initially configured size (e.g., the size of the screen displayed when the immersion level is 1) and processing the surrounding area of the first application execution screen 530 to be relatively dark or blurry (e.g., by applying a first visual effect 540).

Figure 9A:
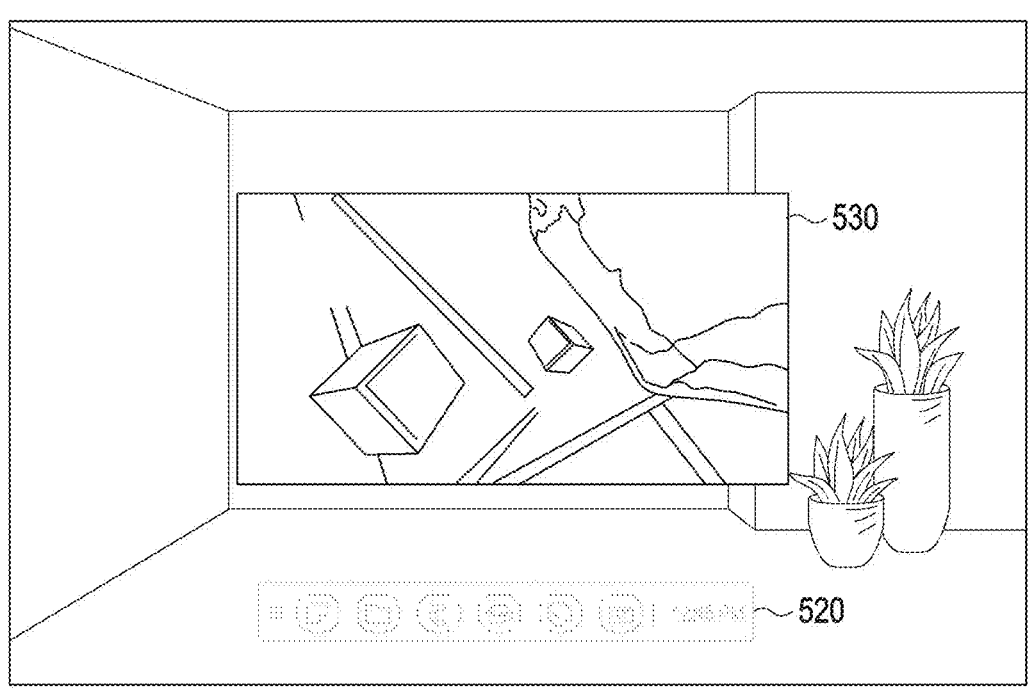
FIGS. 9A, 9B, and 9C are diagrams illustrating a function or operation of changing a display scheme of a virtual object based on an immersion level that changes as an immersive score increases from a user interface perspective when the type of an application running in a wearable device is a second type application (e.g., a game application) according to various embodiments of the disclosure.
Figure 9B:
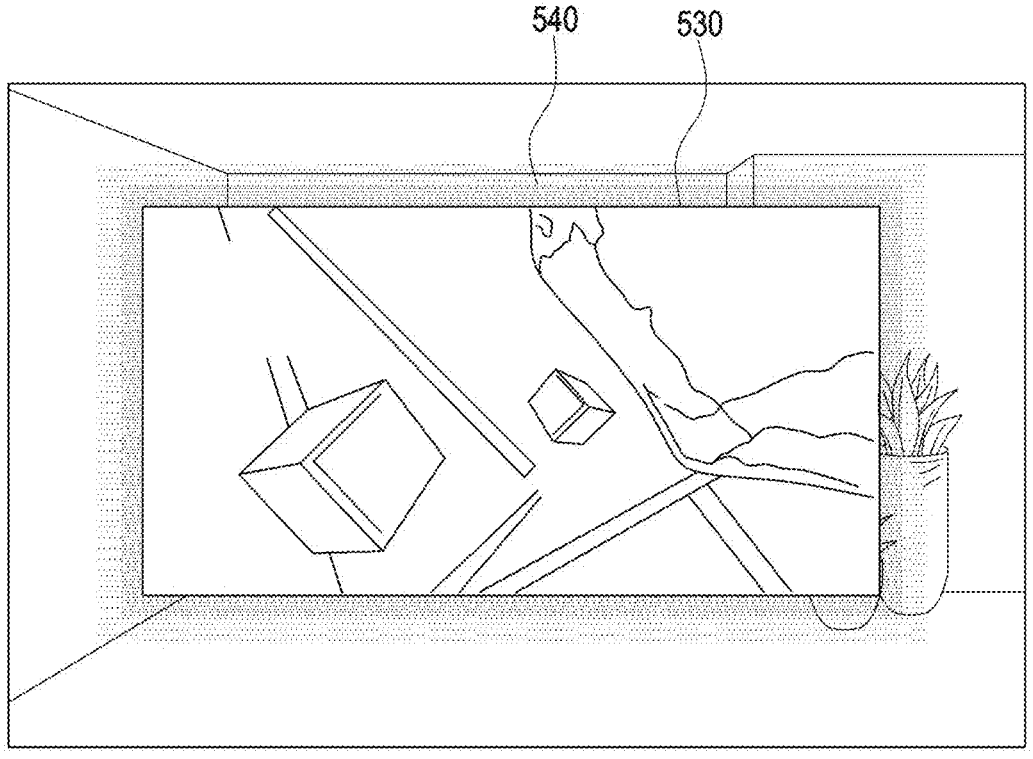
Figure 9C:
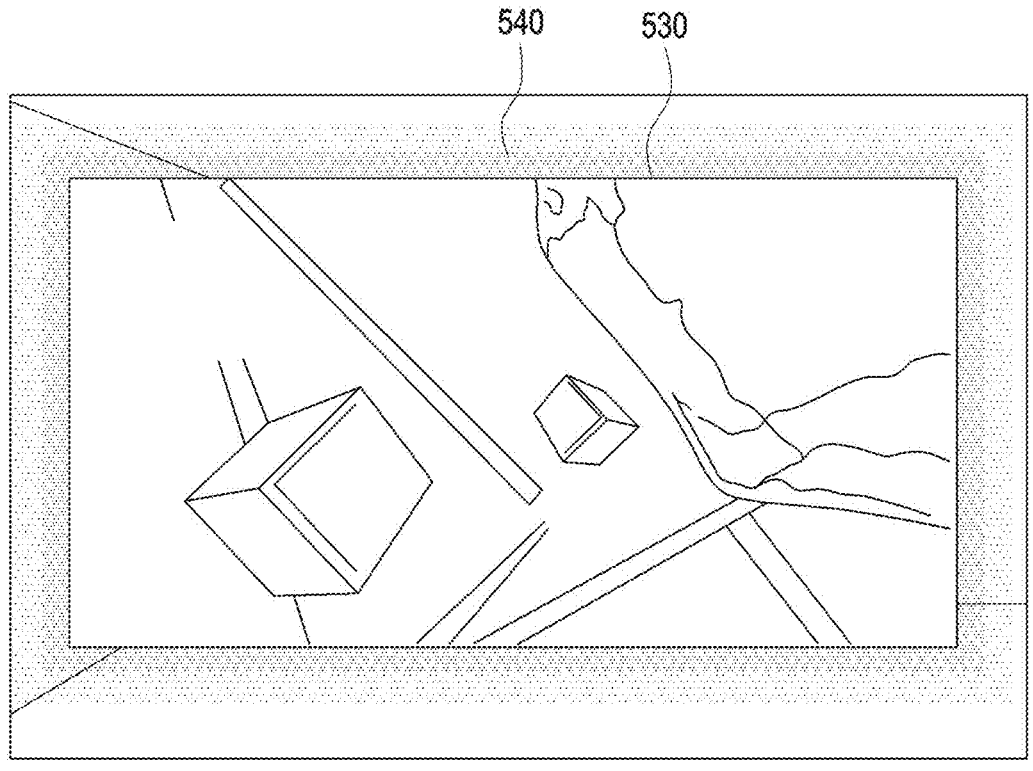

FIGS. 9A, 9B, and 9C are diagrams illustrating a function or operation of changing a display scheme of a virtual object based on an immersion level that changes as an immersive score increases from a user interface perspective when the type of an application running in a wearable device 200 according to an embodiment of the disclosure is a second type application (e.g., a game application) according to various embodiments of the disclosure.

Referring to FIG. 9A, the wearable device 200 according to an embodiment of the disclosure may display a virtual object and an interface according to a level 4, which is the first immersion level. The wearable device 200 according to an embodiment of the disclosure may increase the immersive score by 1 point for each specified time from the score corresponding to the level 4 when a user enters the application control input continuously. Accordingly, for example, when the immersive score is 6, the wearable device 200 according to an embodiment of the disclosure may display a virtual object in an immersive view state, as illustrated in FIG. 9B. For example, the wearable device 200 according to an embodiment of the disclosure may display the first application execution screen 530 by enlarging the first application execution screen 530 (e.g., an active object) by a specified ratio or more than the initially configured size (e.g., the size of the screen displayed when the immersion level is 1) and processing the surrounding area of the first application execution screen 530 to be relatively dark or blurry (e.g., by applying the first visual effect 540 or switching to a virtual reality environment). The wearable device 200 according to an embodiment of the disclosure may increase the immersive score by 1 point every specified time when a user enters the application control input continuously in an immersive view state as illustrated in FIG. 9B. Accordingly, for example, when the immersive score is 8, as illustrated in FIG. 9C, the wearable device 200 according to an embodiment of the disclosure may display a virtual object larger than the size of the virtual object illustrated in FIG. 9b in an immersive view state. For example, the wearable device 200 according to an embodiment of the disclosure may display the first application execution screen 530 by enlarging the first application execution screen 530 (e.g., an active object) by a specified ratio or more than the initially configured size (e.g., the size of the screen displayed when the immersion level is 1) and processing the surrounding area of the first application execution screen 530 to be relatively dark or blurry (e.g., by applying the first visual effect 540 or switching to a virtual reality environment).

Figure 10:
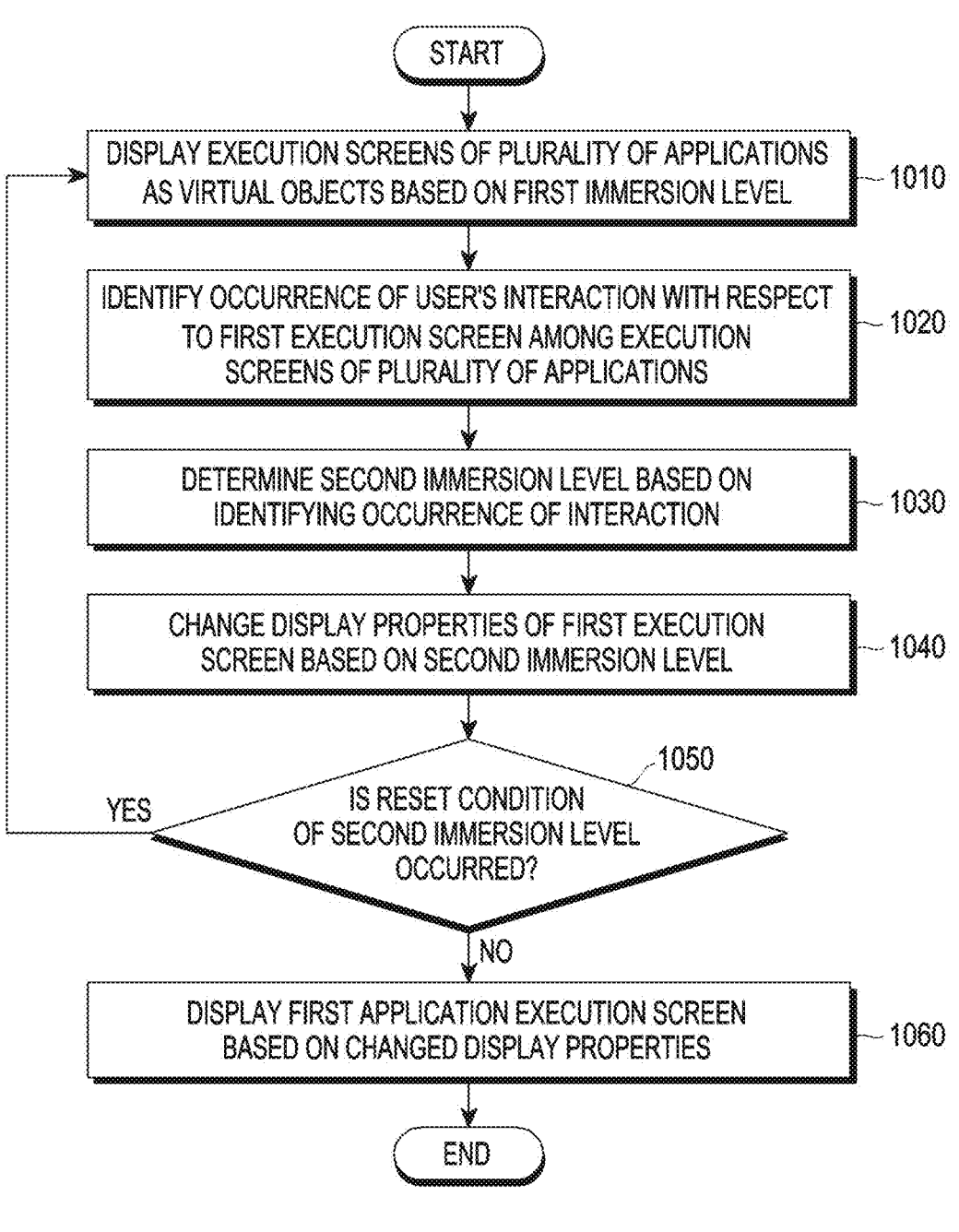
FIG. 10 is a diagram illustrating a function or operation of changing a display scheme of a virtual object as an immersive score increases or resets when there are a plurality of virtual objects according to an embodiment of the disclosure.

FIG. 10 is a diagram illustrating a function or operation of changing a display scheme of a virtual object as an immersive score increases or resets when there are a plurality of virtual objects according to an embodiment of the disclosure.

FIGS. 11A to 11E are diagrams illustrating a function or operation described in FIG. 10 from a user interface perspective according to various embodiments of the disclosure.

Figure 11A:
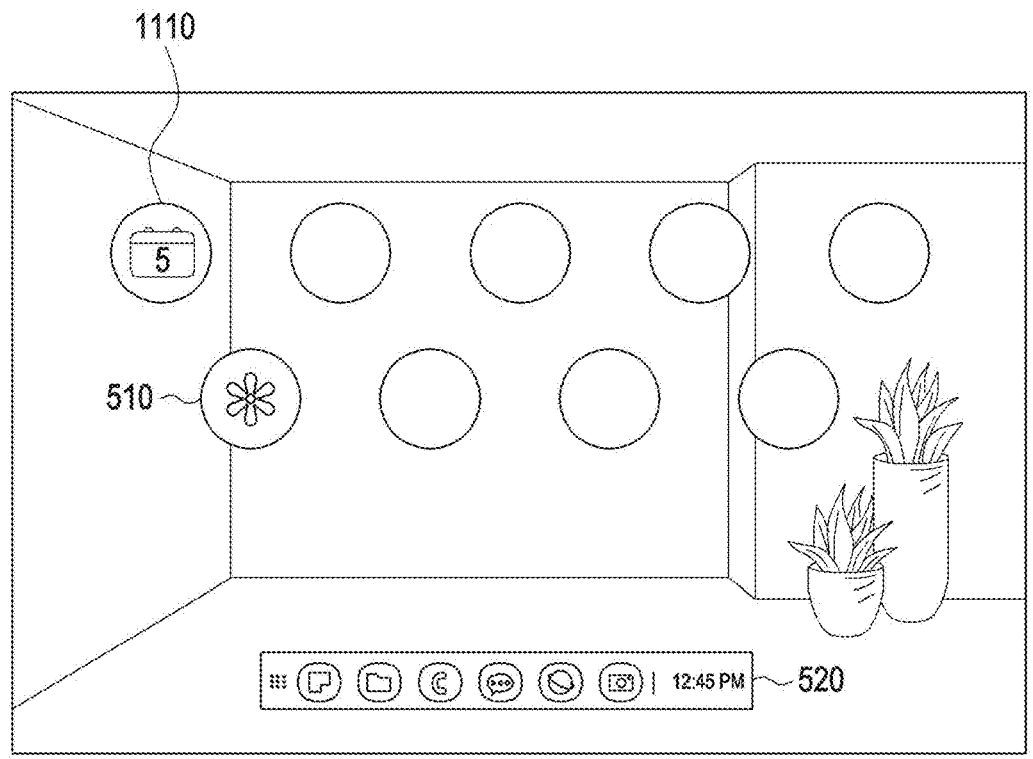
FIGS. 11A, 11B, 11C, 11D, and 11E are diagrams illustrating a function or operation described in FIG. 10 from a user interface perspective according to various embodiments of the disclosure.
Figure 11B:
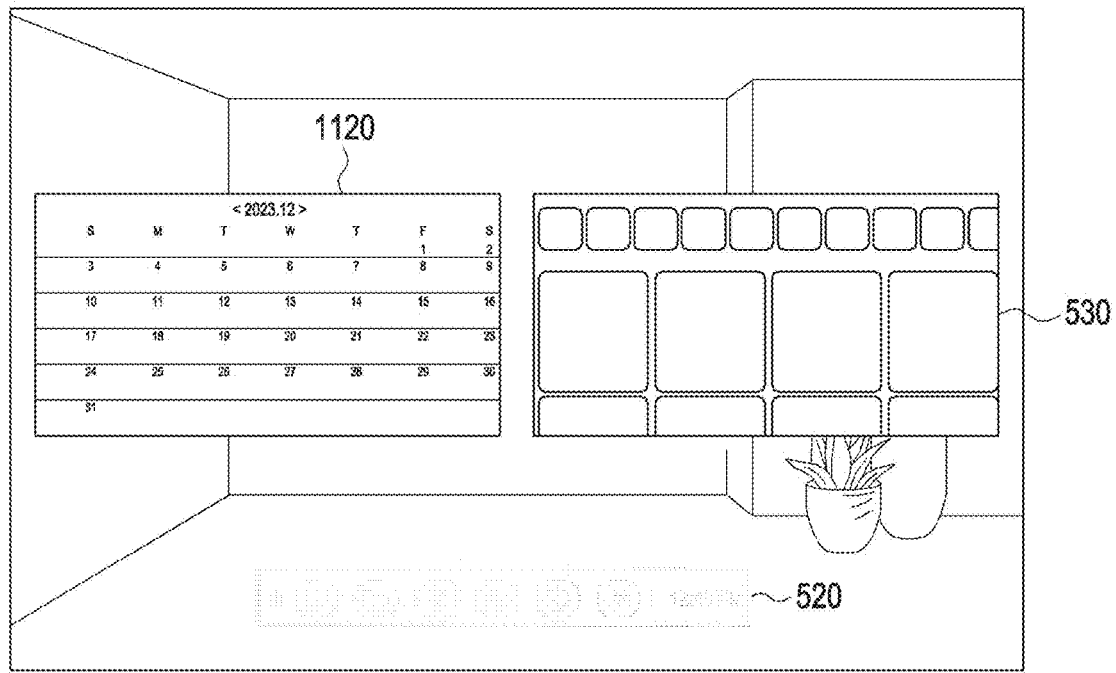

Referring to FIG. 10, in operation 1010, the wearable device 200 according to an embodiment of the disclosure may display execution screens of a plurality of applications as virtual objects based on the first immersion level. The wearable device 200 according to an embodiment of the disclosure may obtain continuous user input for the first icon 510 (e.g., a gallery application) and a second icon 1110 (e.g., a calendar application), as illustrated in FIG. 11A. The user input according to an embodiment of the disclosure may include a user's virtual touch on the icon and/or a user's gaze on the icon. When the immersion level (e.g., the first immersion level as an initial level) is identified as level 3, as illustrated in FIG. 11B, the wearable device 200 according to an embodiment of the disclosure may display execution screens (e.g., the first application execution screen 530 and the second application execution screen 1120) of a plurality of applications and/or trays 520 based on the immersion level 3. As the immersion level is identified as 3, the wearable device 200 according to an embodiment of the disclosure may display the execution screens (e.g., the first application execution screen 530 and the second application execution screen 1120) of the plurality of applications side by side and display the trays 520 blurredly or darkly.

In operation 1020, the wearable device 200 according to an embodiment of the disclosure may identify occurrence of a user's interaction with respect to the first execution screen among execution screens of a plurality of applications. For example, the wearable device 200 according to an embodiment of the disclosure may identify that the user's gaze is continuously maintained with respect to the first application execution screen 530 for a specified time or longer.

Figure 11C:
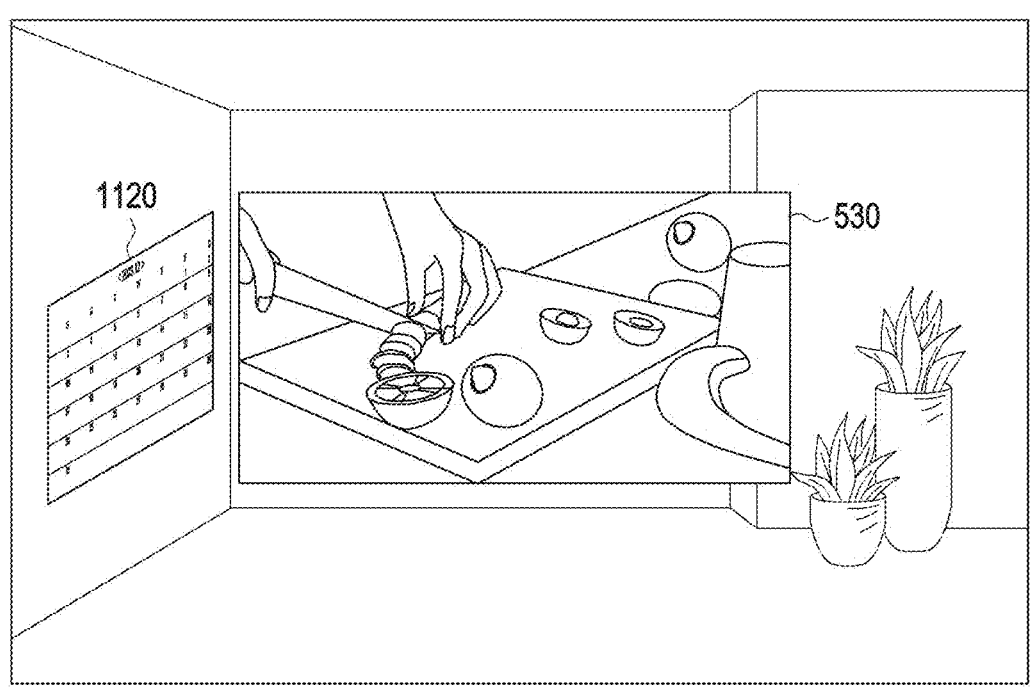
Figure 11D:
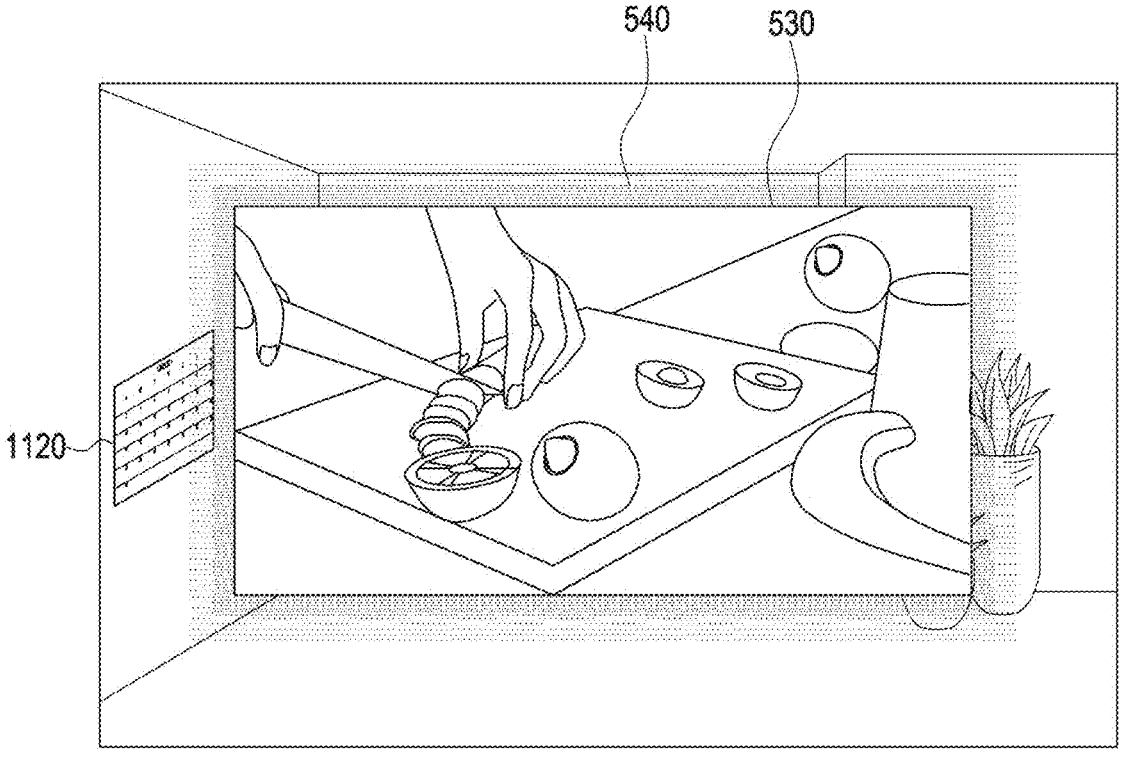

In operation 1030, the wearable device 200 according to an embodiment of the disclosure may determine the second immersion level based on identifying the occurrence of the interaction in operation 1020. In operation 1040, the wearable device 200 according to an embodiment of the disclosure may change the display properties of the first execution screen based on the second immersion level. When identifying that the user's gaze is maintained on the first application execution screen 530 for a specified time or longer, the wearable device 200 according to an embodiment of the disclosure may increase the immersive score by 1 point for every specified time from the immersive score corresponding to the first immersion level. Accordingly, for example, when the immersive score is changed from 3 to 5, the wearable device 200 according to an embodiment of the disclosure may display the size of the first application execution screen 530 by expanding the size of the first application execution screen 530 by a specified ratio than the initially configured size, and may move the display position so that the first application execution screen 530 is displayed at a substantial center of the field of view (FoV) of the wearable device 200 as illustrated in FIG. 11C. In this case, the display position of the second application execution screen 1120 according to an embodiment of the disclosure may be changed as illustrated in FIG. 11C, and the size may be reduced by a specified ratio and displayed. As the user's gaze is maintained on the first application execution screen 530, the wearable device 200 according to an embodiment of the disclosure may display the first application execution screen 530 in the immersive view state, as illustrated in FIG. 11D, when the immersive score is 6. For example, the wearable device 200 according to an embodiment of the disclosure may display the first application execution screen 530 by enlarging the first application execution screen 530 (e.g., an active object) by a specified ratio or more than the initially configured size (e.g., the size of the screen displayed when the immersion level is 1) and processing the surrounding area of the first application execution screen 530 to be relatively dark or blurry (e.g., by applying the first visual effect 540 or switching to a virtual reality environment).

Figure 11E:
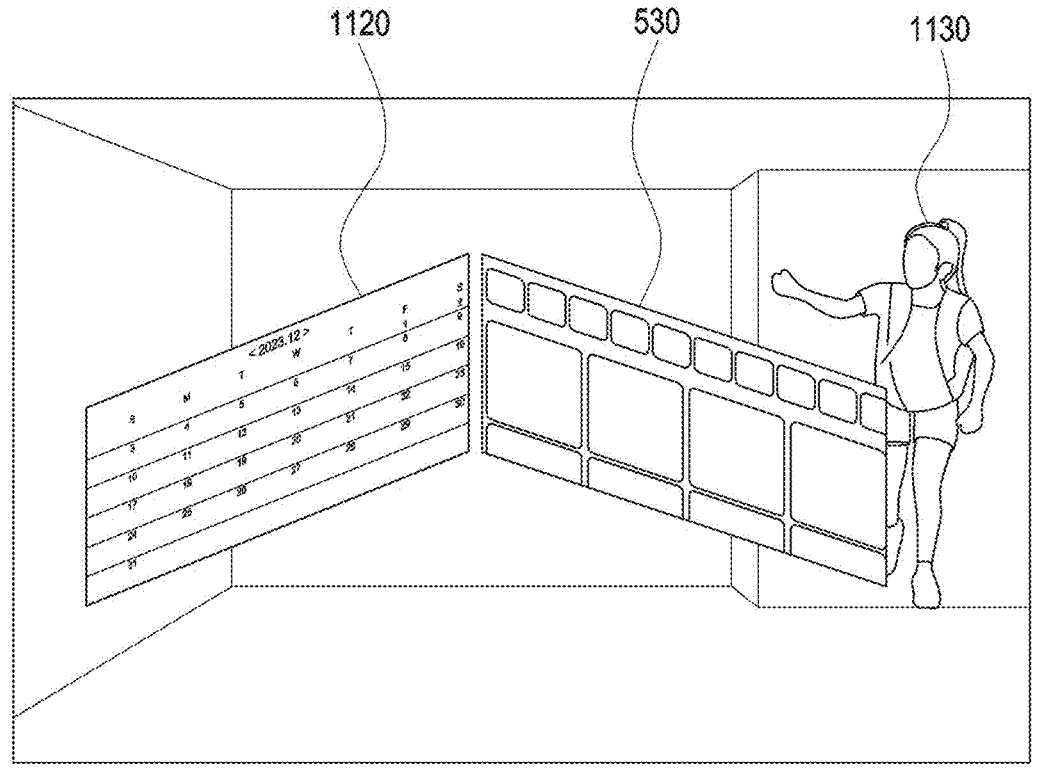

In operation 1050, the wearable device 200 according to an embodiment of the disclosure may determine whether a reset condition of the second immersion level has occurred. For example, the wearable device 200 according to an embodiment of the disclosure may identify that an external object (e.g., another user 1130) is close to the user. When identifying that the external object is close to the user, the wearable device 200 according to an embodiment of the disclosure may display application execution screens based on the first immersion level (e.g., level 3), or display application execution screens in a state of immersion level 1. FIG. 11E illustrates, as an example, an embodiment in which the wearable device 200 according to an embodiment of the disclosure displays application execution screens based on the first immersion level when identifying that the external object is close to the user. However, according to an embodiment of the disclosure, when it is identified that the external object is close to the user, the virtual object may be displayed according to level 1.

In operation 1060, when identifying that the external object is close to the user, the wearable device 200 according to an embodiment of the disclosure may display the first application execution screen 530 based on the changed display properties according to operation 1040. For example, wearable device 200 according to an embodiment of the disclosure may display the first application execution screen 530 in an immersive view state.

Figure 12:
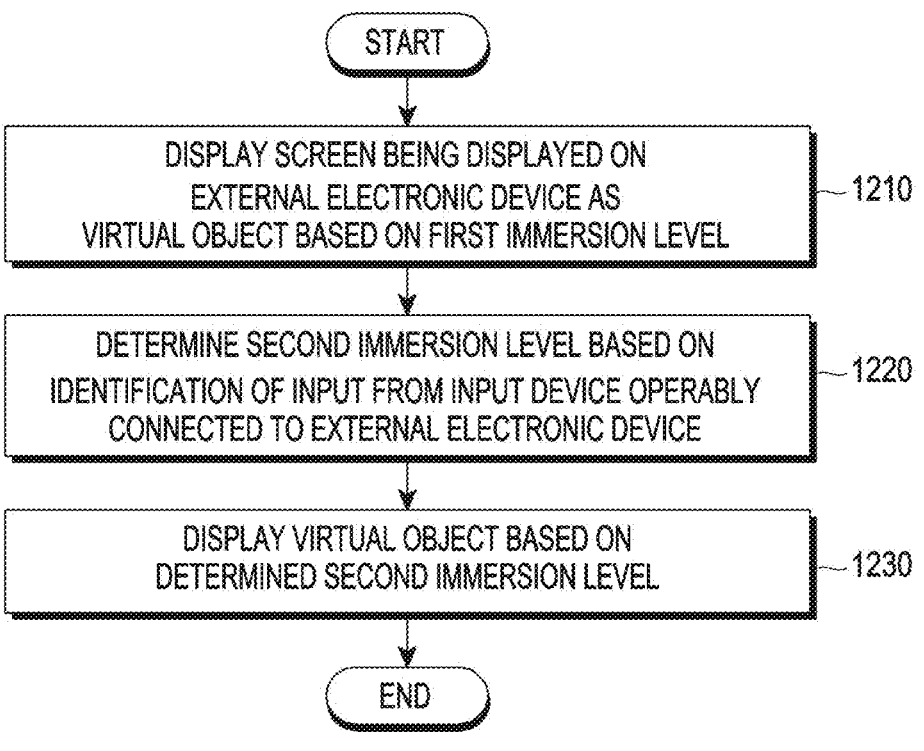
FIG. 12 is a diagram illustrating a function or operation of maintaining or changing a display scheme of a virtual object as an immersive score increases when an application running through a wearable device is a third type application (e.g., an application for document work) according to an embodiment of the disclosure.

FIG. 12 is a diagram illustrating a function or operation of maintaining or changing a display scheme of a virtual object as an immersive score increases when an application running through a wearable device 200 according to an embodiment of the disclosure is a third type application (e.g., an application for document work) according to an embodiment of the disclosure.

FIGS. 13A to 13D are diagrams illustrating a function or operation described in FIG. 12 from a user interface perspective according to various embodiments of the disclosure.

Figure 13A:
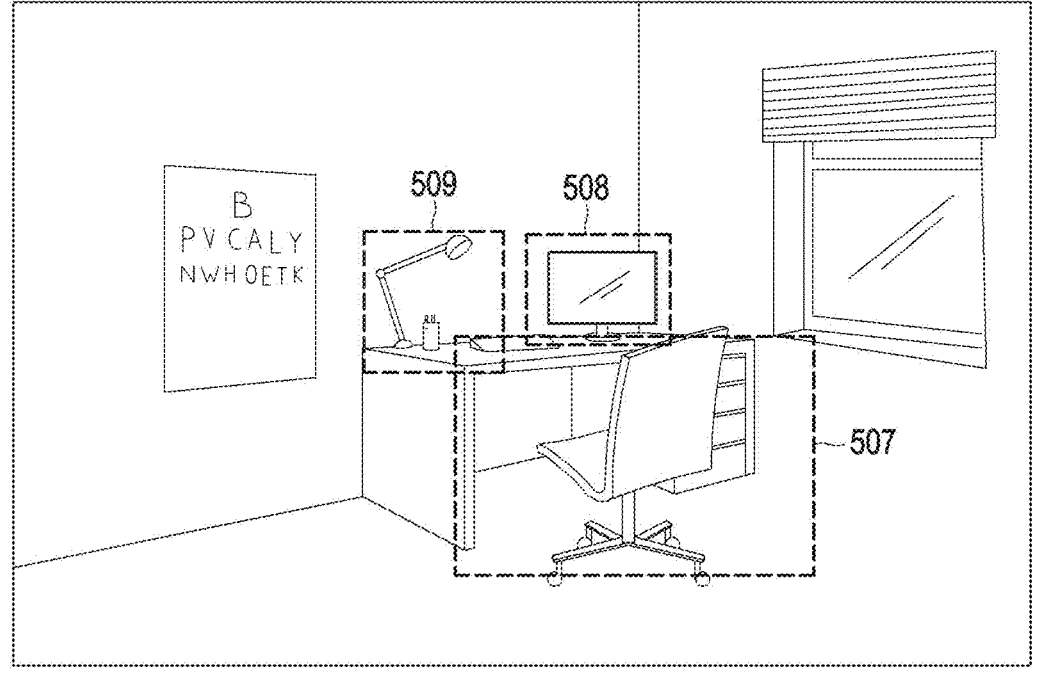
FIGS. 13A, 13B, 13C, and 13D are diagrams illustrating a function or operation described in FIG. 12 from a user interface perspective according to various embodiments of the disclosure.
Figure 13B:
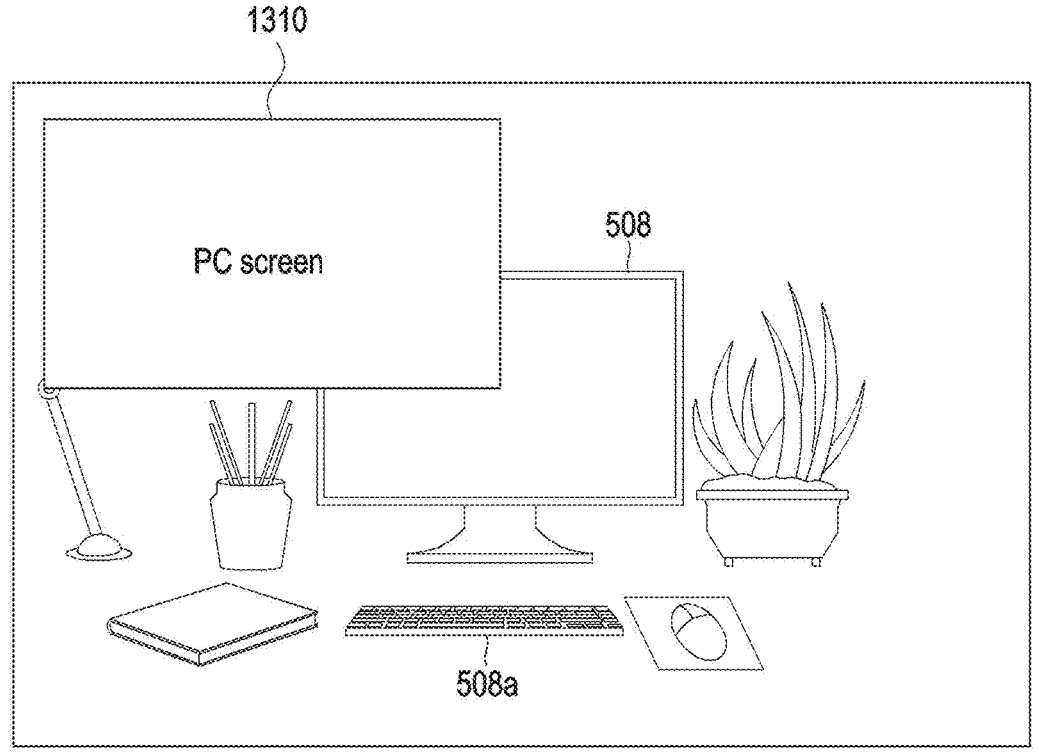

Referring to FIG. 12, in operation 1210, the wearable device 200 according to an embodiment of the disclosure may display a screen displayed by an external electronic device as a virtual object based on the first immersion level. In order to determine the first immersion level, the wearable device 200 according to an embodiment of the disclosure may identify real objects (e.g., a chair 507, a monitor 508, and a table lamp 509) located around the user, as illustrated in FIG. 13A. The wearable device 200 according to an embodiment of the disclosure may calculate an immersive score as 3 points when the surrounding environment is a work environment or a user's posture is in a seated state. The wearable device 200 according to an embodiment of the disclosure may determine an immersion level corresponding to an immersive score of 3 points as level 3. Accordingly, the wearable device 200 according to an embodiment of the disclosure may display a virtual object according to level 3. As illustrated in FIG. 13B, the wearable device 200 according to an embodiment of the disclosure may establish a communication session with an external electronic device when it is identified that the user gazes at the external electronic device while the user is seated. To this end, the wearable device 200 and the external electronic device (e.g., a desktop computer including the monitor 508) according to an embodiment of the disclosure may be connected to the same server, or information capable of being operatively connected to the external electronic device may be stored in the wearable device 200. The wearable device 200 according to an embodiment of the disclosure and the external electronic device may be connected through a short-range communication network such as Bluetooth, wireless fidelity (Wi-Fi) direct, or an infrared data association (IrDA). The wearable device 200 according to an embodiment of the disclosure may obtain information on an application currently running in an external electronic device from the external electronic device. The wearable device 200 according to an embodiment of the disclosure may display a screen being displayed on the external electronic device as a virtual object (e.g., a PC screen 1310) by using the obtained information as illustrated in FIG. 13B. The wearable device 200 according to an embodiment of the disclosure may identify the type of the application running on the external electronic device. For example, wearable device 200 according to an embodiment of the disclosure may identify an application running on the external electronic device as an application for document work.

Figure 13C:
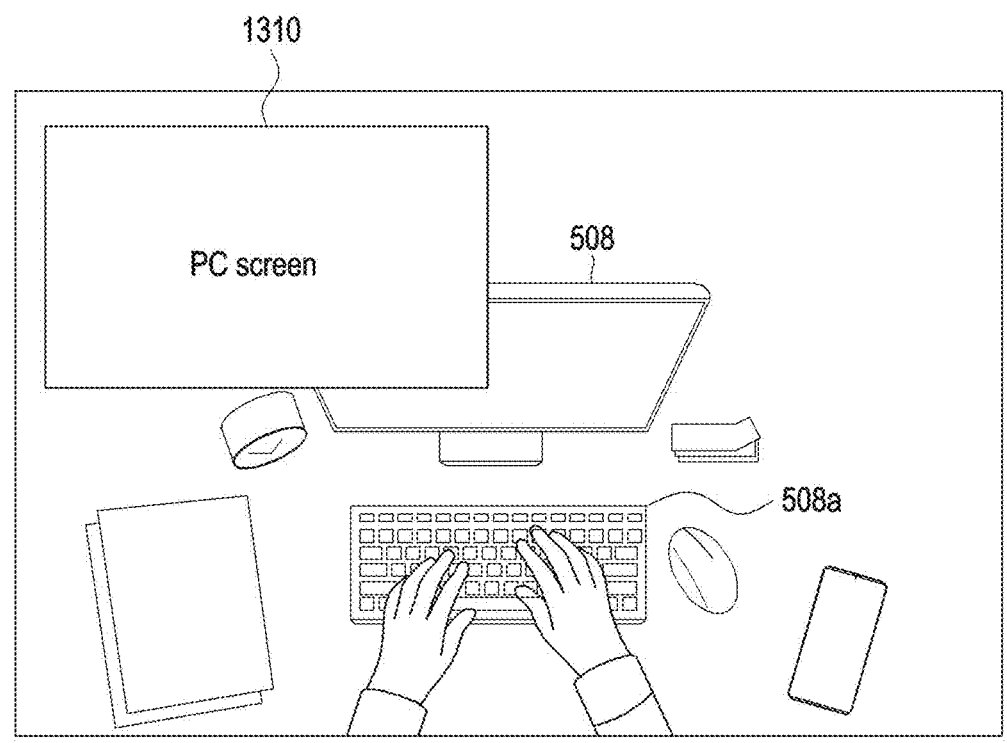
Figure 13D:
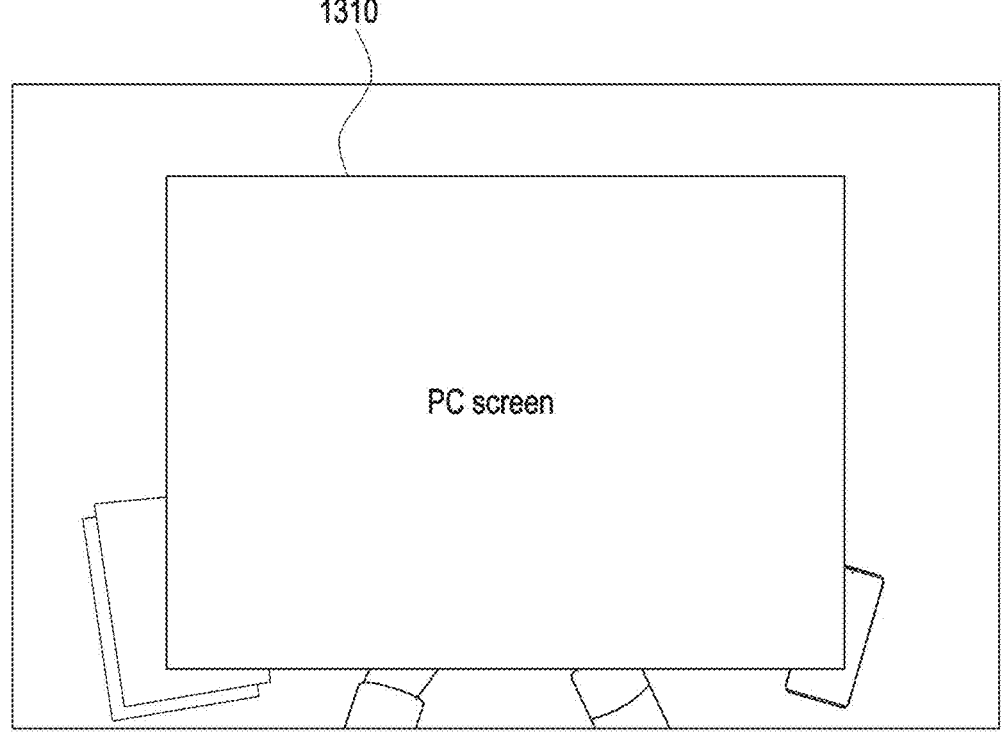

In operation 1220, the wearable device 200 according to an embodiment of the disclosure may determine the second immersion level based on the identification of an input from an input device operably connected to the external electronic device. In operation 1230, the wearable device 200 according to an embodiment of the disclosure may display a virtual object based on the second immersion level determined according to operation 1220. The wearable device 200 according to an embodiment of the disclosure may identify that a user input related to an application is received through an input device (e.g., a physical keyboard 508a or a virtual keyboard). In this case, the wearable device 200 according to an embodiment of the disclosure may determine such a user input as a frequent interaction with an immersive application and may not increase the immersive score. Accordingly, the wearable device 200 according to an embodiment of the disclosure may maintain the current display state as illustrated in FIG. 13C. Alternatively, the wearable device 200 according to an embodiment of the disclosure may determine such a user input as a frequent interaction with an experiential application and may increase the immersive score. Accordingly, the wearable device 200 according to an embodiment of the disclosure may display a virtual object while increasing the immersion level, as illustrated in FIG. 13D. However, in this case, the wearable device 200 according to an embodiment of the disclosure may change the maximum immersion level from level 10 to level 7 when the application type is identified as the third type. Accordingly, a phenomenon in which the virtual object does not match the user's intention may be prevented.

Figure 14:
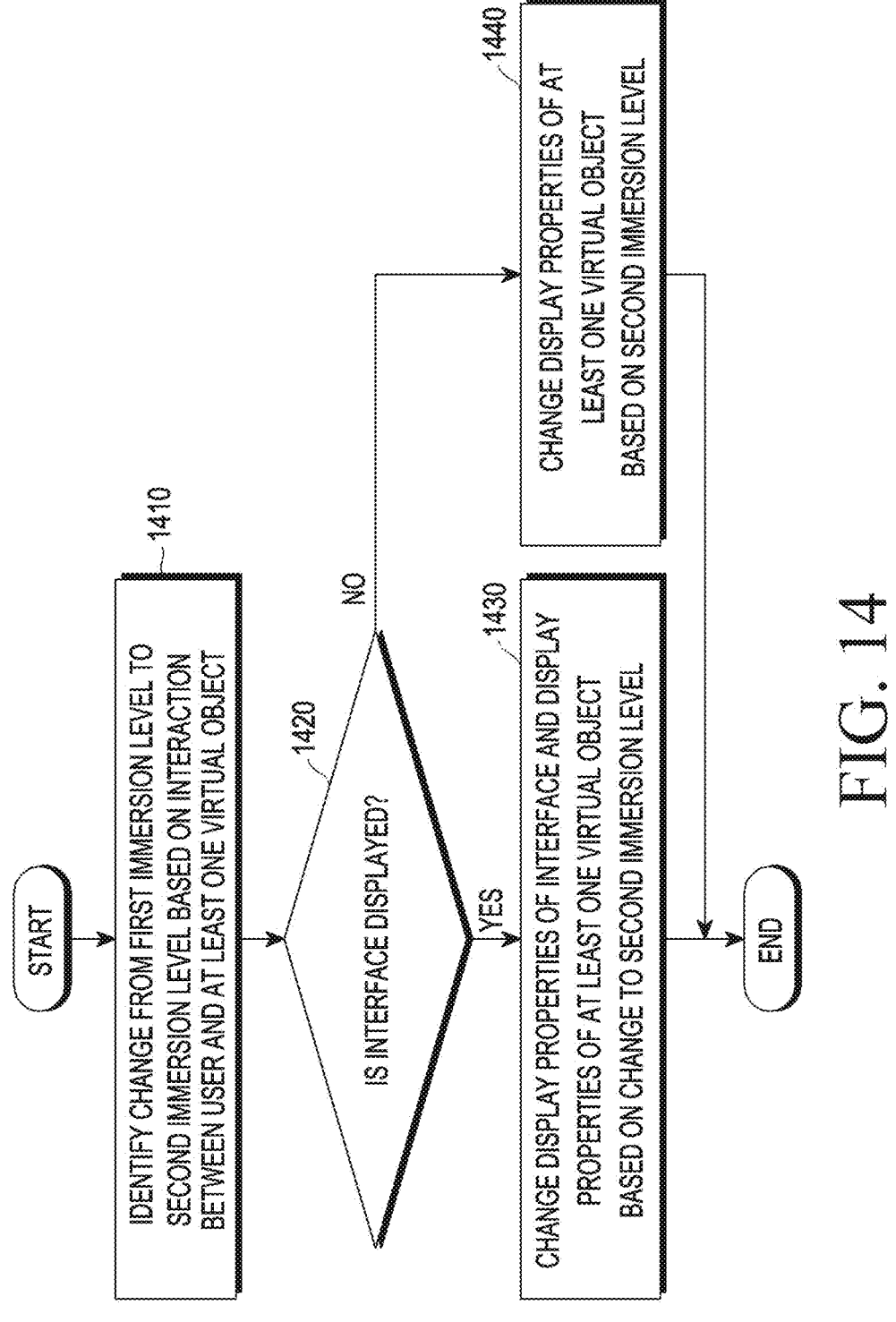
FIG. 14 is a diagram illustrating a function or operation of a wearable device to change display properties of at least one virtual object and interface as an immersion level increases according to various embodiments of the disclosure.

FIG. 14 is a diagram illustrating a function or operation of a wearable device 200 to change display properties of at least one virtual object and interface as an immersion level increases according to various embodiments of the disclosure.

FIGS. 15A and 15B are diagrams illustrating a function or operation described in FIG. 14 from a user interface perspective according to various embodiments of the disclosure.

Referring to FIG. 14, in operation 1410, the wearable device 200 according to an embodiment of the disclosure may identify a change from the first immersion level to the second immersion level based on an interaction between the user and at least one virtual object. For example, the wearable device 200 according to an embodiment of the disclosure may identify that the immersion level increases from 3 to 4 as the user's gaze on the specified application execution screen is maintained.

In operation 1420, the wearable device 200 according to an embodiment of the disclosure may determine whether an interface (e.g., the tray 520 and/or the second application execution screen 1120) is displayed among the virtual objects. In operation 1430, when it is determined that the interface (e.g., the tray 520 and/or the second application execution screen 1120) is displayed among the virtual objects, the wearable device 200 according to an embodiment of the disclosure may change the interface properties and the display properties of at least one virtual object based on a change to the second immersion level. For example, as illustrated in FIG. 15A, as the immersion level increases, the wearable device 200 according to an embodiment of the disclosure may display the tray 520 darkly or blurredly, and may display the second application execution screen 1120 darkly or blurredly. Alternatively, for example, as illustrated in FIG. 15B, as the immersion level increases, the wearable device 200 according to an embodiment of the disclosure may not display the tray 520 or may display the tray darkly or blurredly while reducing the size of the second application execution screen 1120.

When it is determined that the interface (e.g., the tray 520 and/or the second application execution screen 1120) is not displayed in the virtual object, the wearable device 200 according to an embodiment of the disclosure may change the display properties of at least one virtual object based on the second immersion level in operation 1440. For example, the wearable device 200 according to an embodiment of the disclosure may display the first application execution screen 530 according to the second immersion level.

Figure 16:
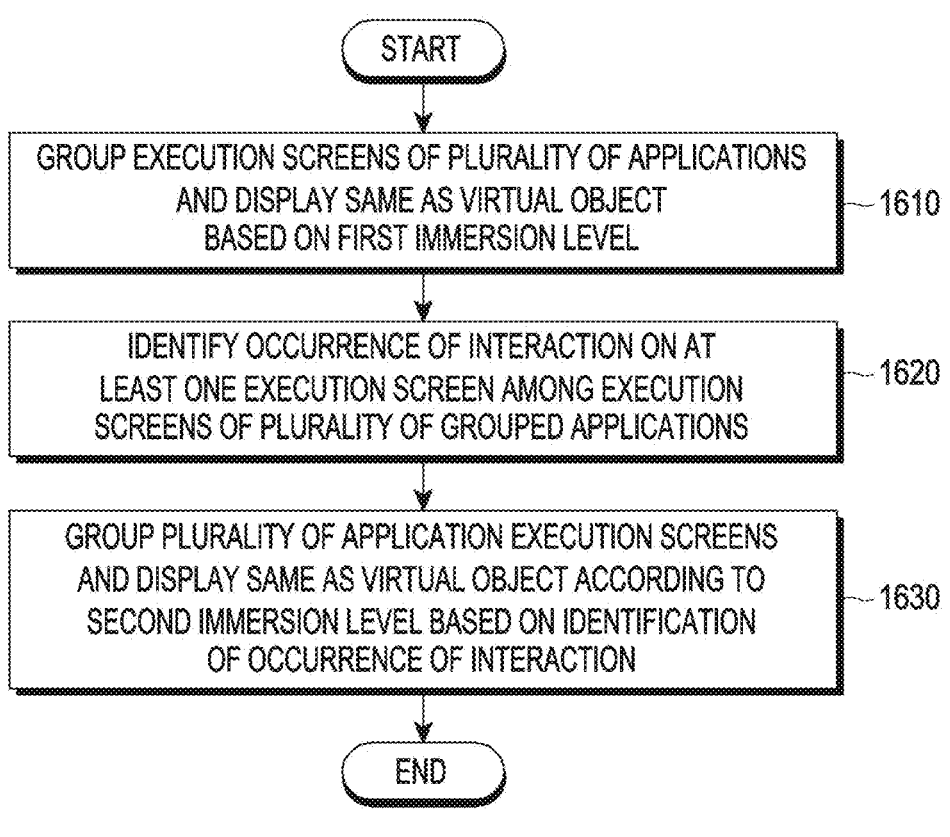
FIG. 16 is a diagram illustrating a function or operation of changing and displaying display properties of virtual objects grouped and displayed by a wearable device based on an interaction with at least one of the virtual objects grouped and displayed according to an embodiment of the disclosure.

FIG. 16 is an diagram illustrating a function or operation of changing and displaying display properties of virtual objects grouped and displayed by a wearable device 200 based on an interaction with at least one of the virtual objects grouped and displayed according to an embodiment of the disclosure.

Figure 17A:
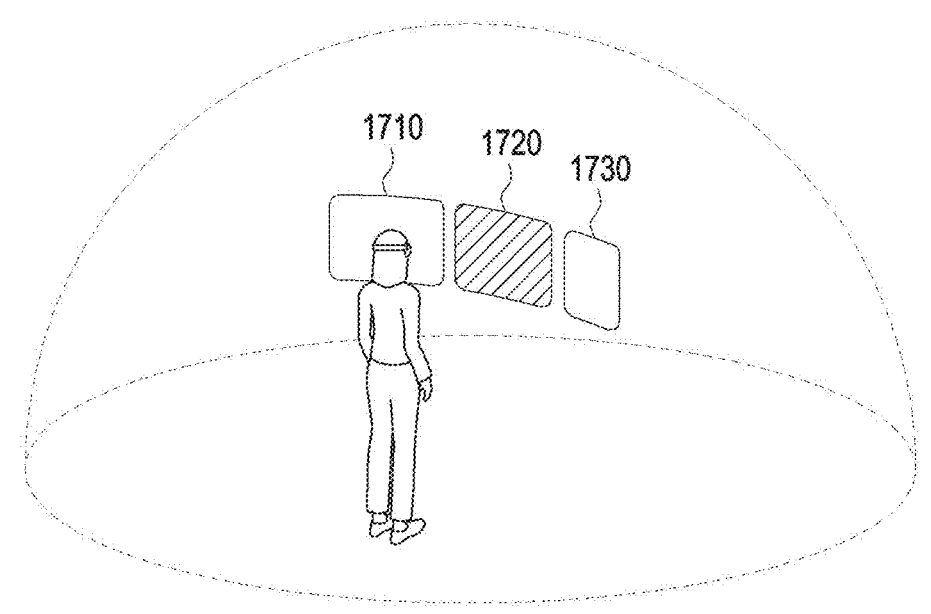
FIGS. 17A and 17B are diagrams illustrating a function or operation described in FIG. 16 from a user interface perspective according to various embodiments of the disclosure.
Figure 17B:
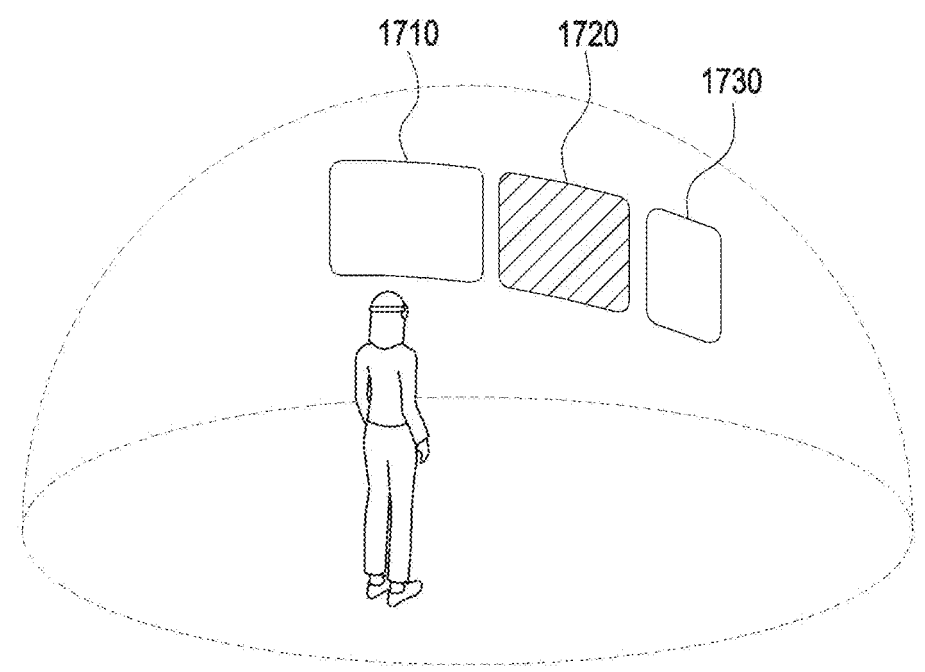

FIGS. 17A and 17B are diagrams illustrating a function or operation described in FIG. 16 from a user interface perspective according to various embodiments of the disclosure.

Referring to FIG. 16, in operation 1610, the wearable device 200 according to an embodiment of the disclosure may group execution screens (e.g., a third application execution screen 1710, a fourth application execution screen 1720, a fifth application execution screen 1730) of a plurality of applications and display the same as a virtual object based on the first immersion level. Grouping and displaying may refer to, for example, a case in which the execution screens of the plurality of applications are controlled at once according to a user gesture on a control bar configured to control the execution screens (e.g., the third application execution screen 1710, the fourth application execution screen 1720, the fifth application execution screen 1730) of the plurality of applications at once. The function or operation of identifying a user gesture according to an embodiment of the disclosure may be performed by a gesture tracker 1936. Referring to FIG. 17A, a case in which three application execution screens (e.g., the third application execution screen 1710, the fourth application execution screen 1720, the fifth application execution screen 1730) are grouped and displayed as virtual objects is exemplarily illustrated.

In operation 1620, the wearable device 200 according to an embodiment of the disclosure may identify the occurrence of an interaction on at least one execution screen (e.g., the fourth application execution screen 1720) among the execution screens (e.g., the third application execution screen 1710, the fourth application execution screen 1720, the fifth application execution screen 1730) of a plurality of grouped applications. The wearable device 200 according to an embodiment of the disclosure may identify a user's gaze on the fourth application execution screen 1720.

In operation 1630, based on the identification of the occurrence of the interaction, the wearable device 200 according to an embodiment of the disclosure may group a plurality of application execution screens (e.g., the third application execution screen 1710, the fourth application execution screen 1720, the fifth application execution screen 1730) and display the same as a virtual object according to the second immersion level. In a case where the application execution screens are grouped, when a change in the immersion level occurs for any one application execution screen, the wearable device 200 according to an embodiment of the disclosure may equally apply a change in the immersion level to the other remaining execution screens. Referring to FIG. 17B, as an interaction on the fourth application execution screen 1720 occurs, the sizes of the third application execution screen 1710 and the fifth application execution screen 1730 are enlarged and displayed.

Figure 17C:
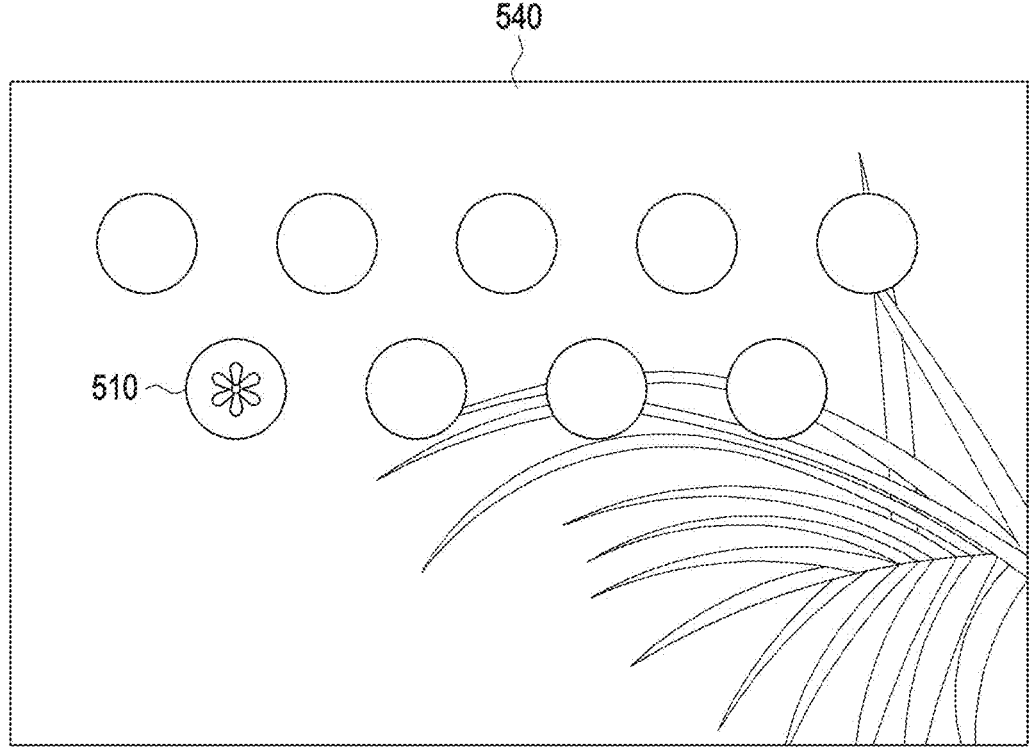
FIG. 17C is a diagram illustrating a function or operation of displaying a virtual object in a complete virtual reality by a wearable device 200 based on a first immersion level exceeding a threshold level according to an embodiment of the disclosure.

FIG. 17C is a diagram illustrating a function or operation of displaying a virtual object in a complete virtual reality by a wearable device 200 according to an embodiment of the disclosure based on a first immersion level exceeding a threshold level. When the identified first immersion level exceeds a threshold level (e.g., a level 5), the wearable device 200 according to an embodiment of the disclosure may display the virtual object on the complete virtual reality without displaying the virtual object in a pass-through method.

Figure 18A:
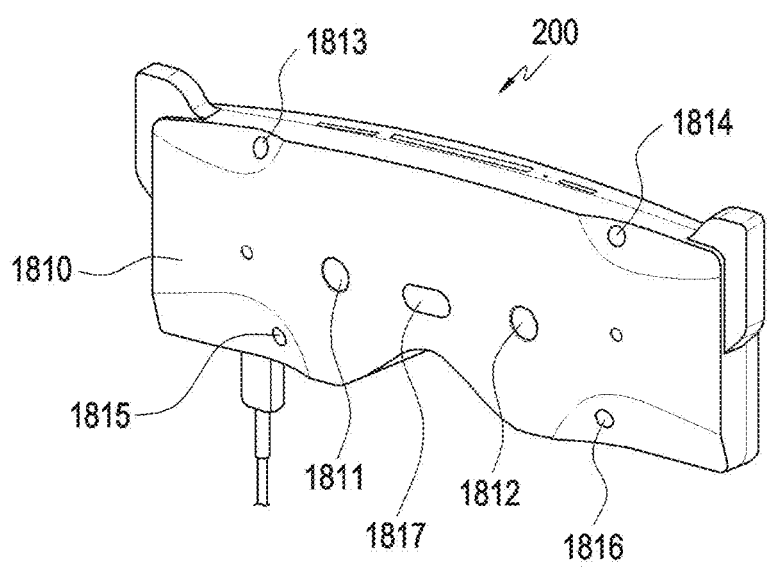
FIGS. 18A and 18B are diagrams illustrating another type of wearable device of according to various embodiments the disclosure.
Figure 18B:
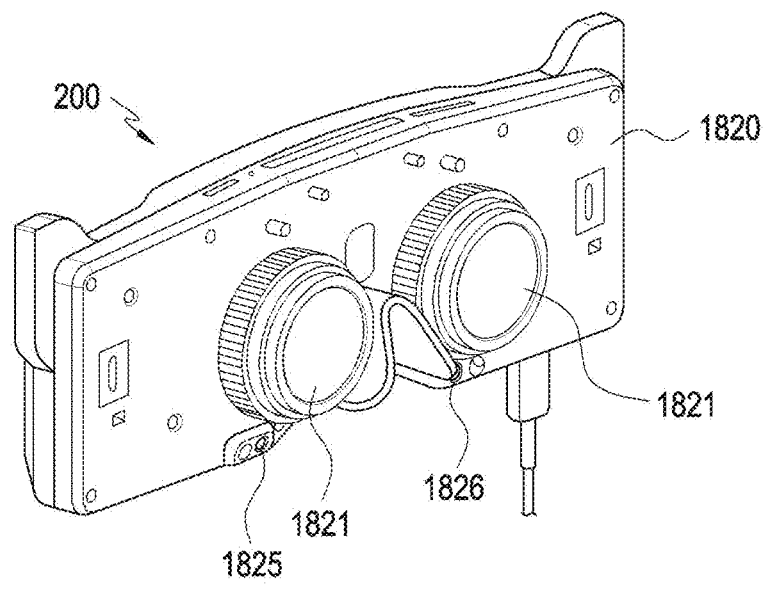

FIGS. 18A and 18B are diagrams illustrating another type of wearable device according to various embodiments of the disclosure.

Referring to FIGS. 18A and 18B, in an embodiment, camera modules 1811, 1812, 1813, 1814, 1815, and 1816 and/or a depth sensor 1817 for obtaining information related to the surrounding environment of the wearable device 200 may be disposed on a first surface 1810 of the housing. In an embodiment, the camera modules 1811 and 1812 may obtain an image related to the surrounding environment of the wearable device. In an embodiment, the camera modules 1813, 1814, 1815, and 1816 may obtain an image while the wearable device 200 is worn by the user. Images obtained through the camera modules 1813, 1814, 1815, and 1816 may be used for simultaneous localization and mapping (SLAM), 6 degrees of freedom (6DoF), 3 degrees of freedom (3DoF), subject recognition and/or tracking, and may be used as an input of the wearable electronic device by recognizing and/or tracking the user's hand. In an embodiment, the depth sensor 1817 may be configured to transmit a signal and receive a signal reflected from a subject, and may be used to identify the distance to an object, such as time of flight (TOF). According to an embodiment, face recognition camera modules 1825 and 1826 and/or a display 1821 (and/or a lens) may be disposed on the second surface 1820 of the housing. In an embodiment, the face recognition camera modules 1825 and 1826 adjacent to the display may be used for recognizing a user's face or may recognize and/or track both eyes of the user. In an embodiment, the display 1821 (and/or lens) may be disposed on the second surface 1820 of the wearable device 200. In an embodiment, the wearable device 200 may not include the camera modules 1815 and 1816 among a plurality of camera modules 1813, 1814, 1815, and 1816. Although not illustrated in FIGS. 18A and 18B, the wearable device 200 may further include at least one of the configurations illustrated in FIGS. 2A to 2C. As described above, the wearable device 200 according to an embodiment may have a form factor for being worn on the user's head. The wearable device 200 may further include a strap for being fixed on the user's body and/or a wearing member (e.g., the wearing member 203). The wearable device 200 may provide a user experience based on augmented reality, virtual reality, and/or mixed reality within a state worn on the user's head.

Figure 19:
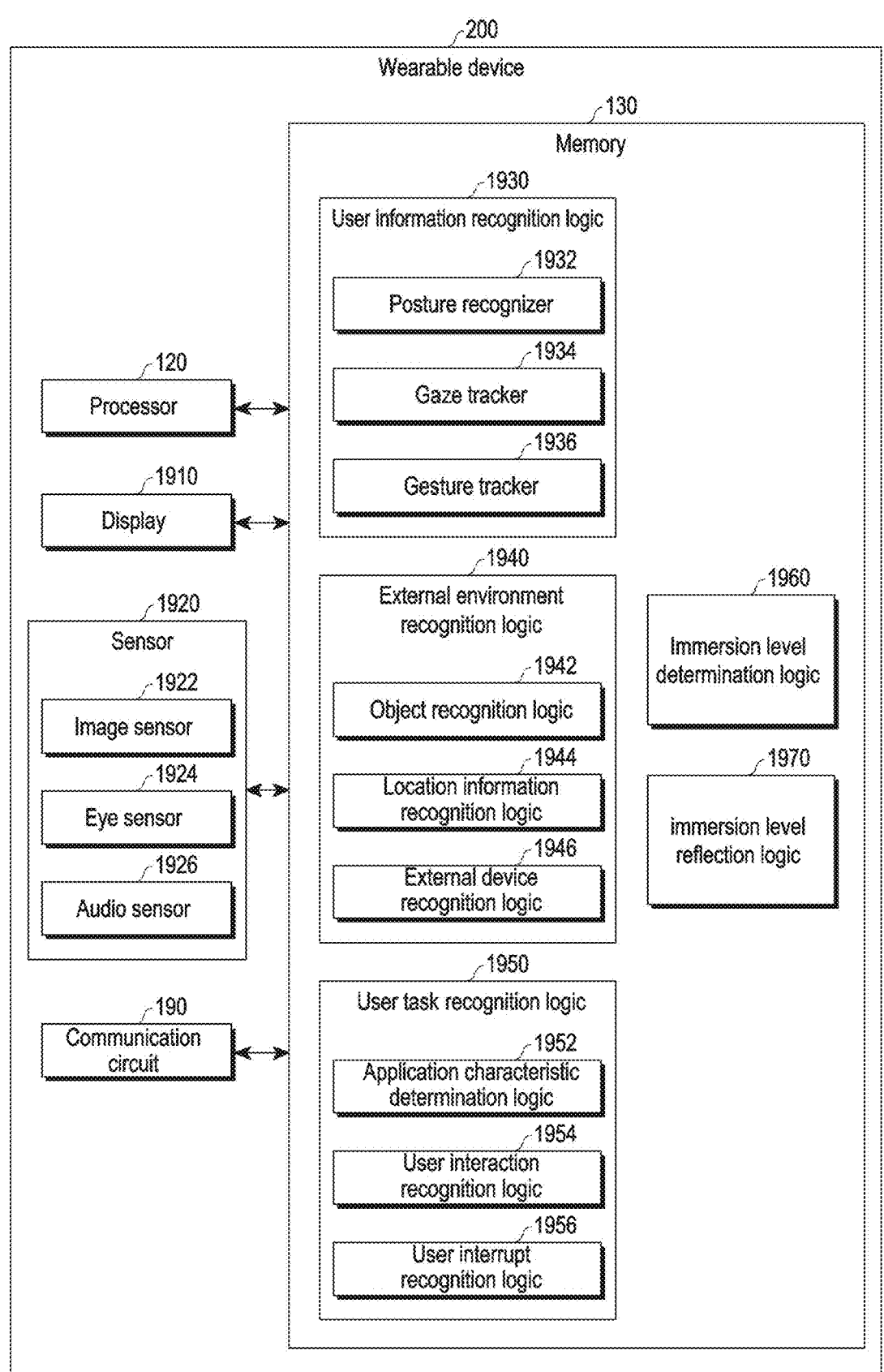
FIG. 19 is a block diagram illustrating a wearable device according to an embodiment of the disclosure.

FIG. 19 is a block diagram illustrating a wearable device 300 according to an embodiment of the disclosure.

Referring to FIG. 19, the wearable device 200 according to an embodiment of the disclosure may include a processor 120. The wearable device 200 according to an embodiment of the disclosure may include a display 1910 (e.g., the display module 160). The wearable device 200 according to an embodiment of the disclosure may include a sensor 1920 (e.g., the sensor module 176). The sensor 1920 according to an embodiment of the disclosure may include at least one of an image sensor 1922 for capturing a user's face or the real world, an eye sensor 1924 for tracking the user's gaze, and an audio sensor 1926 for outputting auditory information. The wearable device 200 according to an embodiment of the disclosure may include a communication module 190.

The wearable device 200 according to an embodiment of the disclosure may include memory 130. Memory 130 according to an embodiment of the disclosure may store at least one of a user information recognition logic 1930, an external environment recognition logic 1940, and a user task recognition logic 1950. The user information recognition logic 1930 according to an embodiment of the disclosure may include at least one of a posture recognizer 1932 for recognizing a user's posture, a gaze tracker 1934 for tracking the user's gaze, and a gesture tracker 1936 for tracking the user's gesture. The external environment recognition logic 1940 according to an embodiment of the disclosure may include at least one of an object recognition logic 1942 for recognizing an object in the real world, a location information recognition logic 1944 for recognizing the location of the wearable device 200, and an external device recognition logic 1946 for recognizing an external device located around the wearable device 200. The user task recognition logic 1950 according to an embodiment of the disclosure may include at least one of an application characteristic determination logic 1952 for determining the type of an application, a user interaction recognition logic 1954 for determining an interaction between a user and an application execution screen, and a user interrupt recognition logic 1956 for identifying the proximity of an external object. In memory 130 according to an embodiment of the disclosure, an immersion level determination logic 1960 for determining an immersion level based on an immersive score may be stored. In memory 130 according to an embodiment of the disclosure, an immersion level reflection logic 1970 for executing an application in which the immersion level is reflected may be stored. The wearable device 200 according to an embodiment of the disclosure may include the sensor 1920, and the sensor 1920 may include the image sensor 1922 for obtaining at least one image, the eye sensor 1924 for tracking the user's eyes, and the audio sensor 1926 for outputting auditory information. The wearable device 200 according to an embodiment of the disclosure may include the display 1910, the processor 120, and/or the communication module 190.

A wearable device 200 according to an embodiment of the disclosure may include at least one sensor (e.g., the sensor module 176 of FIG. 1), at least one camera (e.g., the second camera module 253), at least one processor (e.g., the processor 120 of FIG. 1), and memory, and when executed, memory may be configured to store instructions that causes the at least one processor to identify a real object located around a user based on an image of a real world obtained through the at least one camera, identify a posture of the user wearing the wearable device based on sensing data obtained by the at least one sensor, determine a first immersion level based on the identified real object and the user's posture, display an execution screen of at least one application as a virtual object based on the determined first immersion level, determine a second immersion level based on interaction with the virtual object and the user while the virtual object is displayed, and change a display scheme of the virtual object based on the determined second immersion level.

According to an embodiment of the disclosure, the execution screen displayed according to the first immersion level may be displayed in a virtual reality.

According to an embodiment of the disclosure, the interaction may include a state in which the user's gaze on the execution screen of the at least one application is maintained for more than or equal to a specified time.

According to an embodiment of the disclosure, the interaction may include a state in which a user input for performing a task related to the at least one application is maintained for more than or equal to a specified time.

According to an embodiment of the disclosure, the execution screen displayed according to the second immersion level may include a screen with a size substantially larger than a size of the execution screen displayed according to the first immersion level.

According to an embodiment of the disclosure, the execution screen displayed according to the second immersion level includes a screen in which a brightness of a surrounding area where the execution screen is displayed is darker than the execution screen.

According to an embodiment of the disclosure, the execution screen displayed according to the second immersion level may include a screen displayed at a position closer to a center area of an angle of view of the wearable device than a position of the execution screen displayed according to the first immersion level.

The electronic device according to various embodiments set forth herein may be one of various types of electronic devices. The electronic device may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that the embodiments and the terms used therein are not intended to limit the technological features set forth herein to particular embodiments and the disclosure includes various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C," may include any one or all possible combinations of the items enumerated together in a corresponding one of the phrases. Such terms as "a first," "a second," "the first," and "the second" may be used to simply distinguish a corresponding element from another, and does not limit the elements in other aspect (e.g., importance or order). If an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used in various embodiments of the disclosure, the term "module" may include a unit implemented in hardware, software, or firmware, and may be interchangeably used with other terms, for example, "logic," "logic block," "component," or "circuit". The "module" may be a single integrated component, or a minimum unit or part thereof, adapted to perform one or more functions. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor of the machine (e.g., the electronic device 101) may invoke at least one of the one or more instructions stored in the storage medium, and execute it. This allows the machine to be operated to perform at least one function according to the at least one instruction invoked. The one or more instructions each may include a code generated by a complier or a code executable by an interpreter. The machine-readable storage medium may be provided in the form of a non-transitory storage medium. Herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each element (e.g., a module or a program) of the above-described elements may include a single entity or multiple entities, and some of the multiple entities may be separately disposed in any other element. According to an embodiment, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device, comprising:

at least one sensor;

at least one camera;

memory storing one or more computer programs; and at least one processor communicatively coupled to the at least one sensor, the at least one camera, and the memory, wherein the one or more computer programs include computer-executable instructions that, when executed by the at least one processor individually or collectively, cause the wearable device to:

determine a type of an application executed through the wearable device, based on the determination, in case that the type of the application is a first type application:

display, by the wearable device, a first execution screen of the application through an augmented reality, wherein the first execution screen of the application is displayed as a virtual object in a first immersion level configured to display the first execution screen of the application in a first size, while the first execution screen of the application is displayed as the virtual object, determine a second immersion level according to an interaction with the virtual object by a user, and based on the determined second immersion level, display, by the wearable device, the first execution screen of the application through the augmented reality in the second immersion level configured to display the first execution screen of the application in a second size lager than the first size, and based on the determination, in case that the type of the application is a second type application different from the first type application:

display, by the wearable device, a second execution screen of the application through a virtual reality in a third immersion level higher than the first immersion level and the second immersion level.

2. The wearable device of claim 1, wherein the interaction includes a state in which a user's gaze on the first execution screen of the application is maintained for more than or equal to a specified time.

3. The wearable device of claim 1, wherein the interaction includes a state in which a user input for performing a task related to the application is maintained for more than or equal to a specified time.

4. The wearable device of claim 1, wherein the first execution screen displayed according to the second immersion level includes a screen in which a brightness of a surrounding area where the first execution screen is displayed is darker than the first execution screen.

5. The wearable device of claim 1, wherein the first execution screen displayed according to the second immersion level includes a screen displayed at a position closer to a center area of an angle of view of the wearable device than a position of the first execution screen displayed according to the first immersion level.

6. A method performed by a wearable device, the method comprising:

determining a type of an application executed through the wearable device;

based on the determination, in case that the type of the application is a first type application:

displaying, by the wearable device, a first execution screen of the application through an augmented reality, wherein the first execution screen of the application is displayed as a virtual object in a first immersion level configured to display the first execution screen of the application in a first size;

while the first execution screen of the application is displayed as the virtual object, determining a second immersion level according to an interaction with the virtual object by a user; and based on the determined second immersion level, displaying, by the wearable device, the first execution screen of the application through the augmented reality in the second immersion level configured to display the first execution screen of the application in a second size lager than the first size; and based on the determination, in case that the type of the application is a second type application different from the first type application:

displaying, by the wearable device, a second execution screen of the application through a virtual reality in a third immersion level higher than the first immersion level and the second immersion level.

7. The method of claim 6, wherein the interaction includes a state in which a user's gaze on the first execution screen of the application is maintained for more than or equal to a specified time.

8. The method of claim 6, wherein the interaction includes a state in which a user input for performing a task related to the application is maintained for more than or equal to a specified time.

9. The method of claim 6, wherein the first execution screen displayed according to the second immersion level includes a screen in which a brightness of a surrounding area where the first execution screen is displayed is darker than the first execution screen.

10. The method of claim 6, wherein the first execution screen displayed according to the second immersion level includes a screen displayed at a position closer to a center area of an angle of view of the wearable device than a position of the first execution screen displayed according to the first immersion level.

11. One or more non-transitory computer-readable storage media storing one or more computer programs, the one or more computer programs including computer-executable instructions that, when executed by at least one processor of a wearable device individually or collectively, cause the wearable device to perform operations, the operations comprising:

determining a type of an application executed through the wearable device;

based on the determination, in case that the type of the application is a first type application:

displaying, by the wearable device, a first execution screen of the application through an augmented reality, wherein the first execution screen of the application is displayed as a virtual object in a first immersion level configured to display the first execution screen of the application in a first size;

while the first execution screen of the application is displayed as the virtual object, determining a second immersion level according to an interaction with the virtual object by a user; and based on the determined second immersion level, displaying, by the wearable device, the first execution screen of the application through the augmented reality in the second immersion level configured to display the first execution screen of the application in a second size lager than the first size; and based on the determination, in case that the type of the application is a second type application different from the first type application:

displaying, by the wearable device, a second execution screen of the application through a virtual reality in a third immersion level higher than the first immersion level and the second immersion level.

12. The one or more non-transitory computer-readable storage media of claim 11, wherein the interaction includes a state in which a user's gaze on the first execution screen of the application is maintained for more than or equal to a specified time.

13. The one or more non-transitory computer-readable storage media of claim 11, wherein the interaction includes a state in which a user input for performing a task related to the application is maintained for more than or equal to a specified time.

14. The one or more non-transitory computer-readable storage media of claim 11, wherein the first execution screen displayed according to the second immersion level includes a screen in which a brightness of a surrounding area where the first execution screen is displayed is darker than the first execution screen.

15. The one or more non-transitory computer-readable storage media of claim 11, wherein the first execution screen displayed according to the second immersion level includes a screen displayed at a position closer to a center area of an angle of view of the wearable device than a position of the first execution screen displayed according to the first immersion level.

* * * * *